(12) United States Patent (10) Patent No.: US 12,548,354 B2
Hou et al. (45) Date of Patent: Feb. 10, 2026

(54) METHOD FOR PROCESSING CELL IMAGE, ELECTRONIC DEVICE, AND STORAGE MEDIUM

(71) Applicants: Beijing BOE Technology Development Co., Ltd., Beijing (CN); BOE TECHNOLOGY GROUP CO., LTD., Beijing (CN)

(72) Inventors: Mengjun Hou, Beijing (CN); Kai Geng, Beijing (CN); Shuang Gao, Beijing (CN)

(73) Assignees: Beijing BOE Technology Development Co., Ltd, Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 399 days.

(21) Appl. No.: 18/246,348

(22) PCT Filed: May 17, 2022

(86) PCT No.: PCT/CN2022/093258
§ 371 (c)(1),
(2) Date: Mar. 23, 2023

(87) PCT Pub. No.: WO2023/220913
PCT Pub. Date: Nov. 23, 2023

(65) Prior Publication Data
US 2024/0029456 A1    Jan. 25, 2024

(51) Int. Cl.
*G06V 20/69* (2022.01)
*G06T 5/30* (2006.01)
(Continued)

(52) U.S. Cl.
CPC .............. *G06V 20/695* (2022.01); *G06T 5/30* (2013.01); *G06T 7/0012* (2013.01); *G06T 7/136* (2017.01);
(Continued)

(58) Field of Classification Search
CPC ...... G06V 20/695; G06V 10/28; G06V 10/46; G06V 10/762; G06V 10/26; G06T 5/30;
(Continued)

(56) References Cited

U.S. PATENT DOCUMENTS 8,582,861 B2 * 11/2013 Hasslmeyer ......... G06V 20/695
436/519

FOREIGN PATENT DOCUMENTS

CN       101692282 A    4/2010
CN       103020707 A    4/2013
(Continued)

OTHER PUBLICATIONS

Qikai, Xia, "Research on Parameter Optimization Method of SVM Model for Cell Recognition Based on Python," Master Dissertation, Qilu University of Technology, May 24, 2019, 183 pages.
(Continued)

*Primary Examiner* — Vu Le
*Assistant Examiner* — Rachel Anne Ometz
(74) *Attorney, Agent, or Firm* — Westman, Champlin & Koehler, P.A.

(57) ABSTRACT

The present disclosure provides a method for processing a cell image, an electronic device, and a storage medium. The method includes: obtaining, based on a morphological method, a target cell nucleus map according to an initial image segmentation result of a target cell image, where the target cell image is an image corresponding to at least one cell; obtaining, based on the morphological method, a target cell region contour map according to the target cell nucleus
(Continued)

map and the initial image segmentation result; obtaining, based on the morphological method, a target cell contour map according to the target cell region contour map and the target cell nucleus map; and obtaining a target image segmentation result according to the target cell contour map and the target cell nucleus map.

20 Claims, 16 Drawing Sheets

(51) Int. Cl.
*G06T 7/00* (2017.01)
*G06T 7/136* (2017.01)
*G06V 10/28* (2022.01)
*G06V 10/46* (2022.01)
*G06V 10/762* (2022.01)

(52) U.S. Cl.
CPC ............. *G06V 10/28* (2022.01); *G06V 10/46* (2022.01); *G06V 10/762* (2022.01); *G06T 2207/20036* (2013.01); *G06T 2207/30024* (2013.01)

(58) Field of Classification Search
CPC ............. G06T 7/0012; G06T 7/136; G06T 2207/20036; G06T 2207/30024; G06T 2207/10056; G06T 7/11; G06T 7/12; G06T 7/155
See application file for complete search history.

(56) References Cited

FOREIGN PATENT DOCUMENTS

| | | | | | |
|---|---|---|---|---|---|
| CN | 107316077 | A | | 11/2017 | |
| CN | 109685783 | A | | 4/2019 | |
| CN | 110120056 | A | | 8/2019 | |
| CN | 110135271 | A | * | 8/2019 | ........... G06V 20/695 |
| CN | 111091571 | A | | 5/2020 | |
| CN | 111402199 | A | | 7/2020 | |
| CN | 111504885 | A | | 8/2020 | |
| CN | 107316077 | B | * | 9/2020 | ............ G06T 7/155 |
| CN | 112053355 | A | | 12/2020 | |
| CN | 112132843 | A | | 12/2020 | |
| CN | 113313719 | A | | 8/2021 | |
| CN | 113570633 | A | | 10/2021 | |
| CN | 113689396 | A | | 11/2021 | |
| CN | 113936013 | A | | 1/2022 | |
| NL | 2024777 | B1 | * | 12/2020 | ........... G06V 20/695 |
| WO | 2016091016 | A1 | | 6/2016 | |

OTHER PUBLICATIONS

Shengyang, Li, "Study on the method of segmentation and analysis of medical cell's image," Academic Dissertation, Shandong University of Science and Technology, May 2003, 174 pages.

* cited by examiner

METHOD FOR PROCESSING CELL IMAGE, ELECTRONIC DEVICE, AND STORAGE MEDIUM

CROSS-REFERENCE TO RELATED APPLICATION

This application is a Section 371 National Stage Application of International Application No. PCT/CN2022/093258, filed May 17, 2022, entitled "METHOD FOR PROCESSING CELL IMAGE, ELECTRONIC DEVICE, AND STORAGE MEDIUM", the disclosure of which is incorporated herein by reference in its entirety.

TECHNICAL FIELD

The present disclosure relates to a field of an image processing technology, in particular to a method for processing a cell image, an electronic device, and a storage medium.

BACKGROUND

An application of the image processing technology in biomedicine is in the ascendant and may promote a development of biomedicine. A medical image plays an important role in clinical diagnosis, new drug development, and basic research. The medical image may include a macroscopic image and a microscopic image. The microscopic image may include an image of a cell or tissue acquired by means of a microscope. For example, the microscopic image may include a cell image.

Medical image processing is an application of a mathematical image processing technology combined with characteristics of the medical image, which may provide more accurate and rich medical information for medical diagnosis, and has received more and more attention. Cell image segmentation is an application field of the medical image processing, which is a sign and research means of a biological research from a qualitative description to a quantitative research.

SUMMARY

In view of this, the present disclosure provides a method for processing a cell image, an electronic device, and a storage medium.

In an aspect, the present disclosure provides a method for processing a cell image, including: obtaining, based on a morphological method, a target cell nucleus map according to an initial image segmentation result of a target cell image, where the target cell image is an image corresponding to at least one cell; obtaining, based on the morphological method, a target cell region contour map according to the target cell nucleus map and the initial image segmentation result; obtaining, based on the morphological method, a target cell contour map according to the target cell region contour map and the target cell nucleus map; and obtaining a target image segmentation result according to the target cell contour map and the target cell nucleus map.

In another aspect, the present disclosure provides an electronic device, including: one or more processors; and a memory configured to store one or more programs, where the one or more programs, when executed by the one or more processors, cause the one or more processors to implement the method described in the present disclosure.

In another aspect, the present disclosure provides a computer-readable storage medium having executable instructions stored thereon, where the instructions are configured to, when executed, implement the method described in the present disclosure.

In another aspect, the present disclosure provides a computer program product containing computer executable instructions, where the instructions are configured to, when executed, implement the method described in the present disclosure.

BRIEF DESCRIPTION OF THE DRAWINGS

The above and other objectives, features and advantages of the present disclosure will be clearer through the following descriptions of the embodiments of the present disclosure with reference to the accompanying drawings, in which.

DETAILED DESCRIPTION OF EMBODIMENTS

Figure 1:
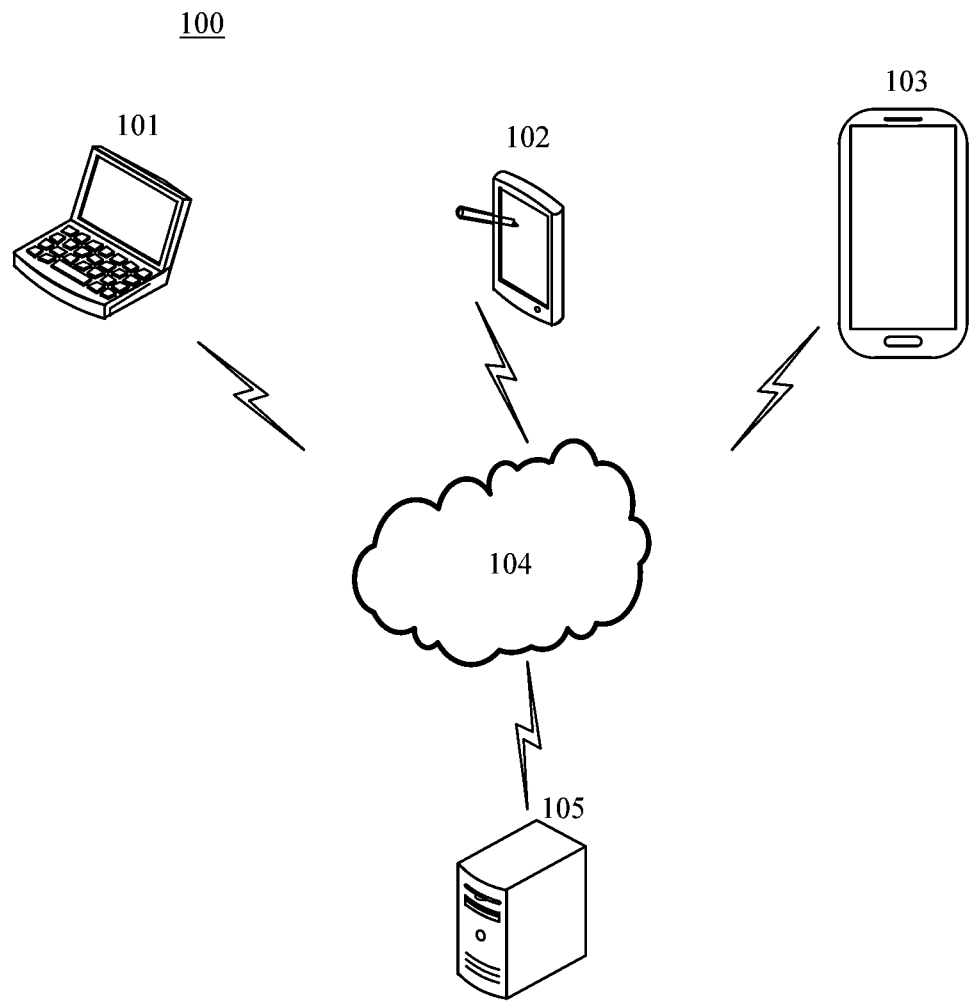
FIG. 1 schematically shows an exemplary system architecture to which a method and an apparatus for processing a cell image may be applied according to the embodiments of the present disclosure.

The embodiments of the present disclosure will be described below with reference to the accompanying drawings. It should be understood, however, that these descriptions are merely exemplary and are not intended to limit the scope of the present disclosure. In the following detailed descriptions, for ease of interpretation, many specific details are set forth to provide a comprehensive understanding of the embodiments of the present disclosure. However, it is clear that one or more embodiments may also be implemented without these specific details. In addition, in the following descriptions, descriptions of well-known structures and technologies are omitted to avoid unnecessarily obscuring the concepts of the present disclosure.

Terms used herein are merely for the purpose of describing specific embodiments and are not intended to limit the present disclosure. The terms "including", "containing", etc. used herein indicate the presence of the feature, step, operation and/or component, but do not exclude the presence or addition of one or more other features, steps, operations or components.

All terms (including technical and scientific terms) used herein have the meanings generally understood by those skilled in the art, unless otherwise defined. It should be noted that the terms used herein shall be interpreted to have meanings consistent with the context of this specification, and shall not be interpreted in an idealized or overly rigid manner.

In a case of using the expression similar to "at least one of A, B and C", it should be explained according to the meaning of the expression generally understood by those skilled in the art (for example, "a system including at least one of A, B and C" should include but not be limited to a system including A alone, a system including B alone, a system including C alone, a system including A and B, a system including A and C, a system including B and C, and/or a system including A, B and C). In a case of using the expression similar to "at least one of A, B or C", it should be explained according to the meaning of the expression generally understood by those skilled in the art (for example, "a system including at least one of A, B or C" should include but not be limited to a system including A alone, a system including B alone, a system including C alone, a system including A and B, a system including A and C, a system including B and C, and/or a system including A, B and C).

A cell image segmentation may refer to dividing a cell image into different regions by using a computer image processing technique, extracting a valuable parenchymal cell region therefrom, and further separating overlapping cells to obtain cell nucleus and cytoplasm, so as to provide a basis for a subsequent quantitative analysis.

The cell image segmentation may be performed using a deep learning model. The deep learning model may be trained by using sample images, and the sample images need to be labeled manually. After the model is trained, if an environment in which the cell image is taken changes, the model needs to be retrained. Therefore, the deep learning model has a poor robustness.

In view of this, the embodiments of the present disclosure propose a morphology-based solution of processing a cell image. For example, a target cell nucleus map may be obtained according to an initial image segmentation result of a target cell image based on a morphological method. The target cell image is an image corresponding to at least one cell. A target cell region contour map may be obtained according to the target cell nucleus map and the initial image segmentation result based on the morphological method. A target cell contour map may be obtained according to the target cell region contour map and the target cell nucleus map based on the morphological method. A target image segmentation result may be obtained according to the target cell contour map and the target cell nucleus map.

According to the embodiments of the present disclosure, the morphological method is used to perform a segmentation on the cell image to obtain the target image segmentation result. With the above operations, an image segmentation result may be obtained without spending manpower for data labeling. In addition, the above operations are independent of the environment in which the cell image is taken, thereby having a strong robustness.

In addition, after the target image segmentation result is obtained, the morphology-based solution of processing the cell image in the embodiments of the present disclosure may be further implemented to determine a cell statistical information according to the target image segmentation result, and determine a cell quality evaluation result according to the cell statistical information. For example, the cell statistical information may include at least one of: a cell quantity, a cell area, a cell circumference, a total cell area, a long axis length of cell, or a short axis length of cell.

By evaluating a cell quality according to the image segmentation result, the evaluation result may avoid an error caused by a human factor, and a cell culture process may be further standardized, so that production costs may be effectively reduced. In an actual industrial production, it is possible to achieve a rapid analysis of continuous target cell images with a statistical accuracy of 90% or above.

FIG. 1 schematically shows an exemplary system architecture to which a method and an apparatus for processing a cell image may be applied according to the embodiments of the present disclosure.

It should be noted that FIG. 1 is merely an example of a system architecture to which embodiments of the present disclosure may be applied, so as to help those skilled in the art to understand technical contents of the present disclosure. It does not mean that the embodiments of the present disclosure may not be applied to other devices, systems, environments or scenarios. For example, in another embodiment, the exemplary system architecture to which the method and apparatus for processing the cell image may be applied may include a terminal device, but the terminal device may implement the method and apparatus for processing the cell image provided by the embodiments of the present disclosure without interacting with a server.

As shown in FIG. 1, a system architecture 100 according to such embodiments may include terminal devices 101, 102 and 103, a network 104, and a server 105. The network 104 is used as a medium for providing a communication link between the terminal devices 101, 102, 103 and the server 105. The network 104 may include various connection types, such as wired and/or wireless communication links, and the like.

The terminal devices 101, 102 and 103 may be used by a user to interact with the server 105 through the network 104, so as to receive or send messages. The terminal devices 101, 102 and 103 may be installed with various communication client applications, such as shopping applications, web browser applications, search applications, instant messaging tools, mailbox clients and/or social platform software, etc. (just examples).

The terminal devices 101, 102 and 103 may be various electronic devices with display screens and supporting web browsing, including but not limited to smart phones, tablet computers, laptop computers and desktop computers.

The server 105 may be various types of servers providing various services. For example, the server 105 may be a cloud server, also known as a cloud computing server or a cloud host, which is a host product in a cloud computing service system to solve shortcomings of difficult management and weak service scalability existing in a traditional physical host and VPS (Virtual Private Server) service. The server 105 may also be a server of a distributed system or a server combined with a block-chain.

It should be noted that the method for processing the cell image provided by the embodiments of the present disclosure may generally be performed by the terminal device 101, 102 or 103. Accordingly, the apparatus for processing the cell image provided by the embodiments of the present disclosure may also be provided in the terminal device 101, 102 or 103.

Alternatively, the method for processing the cell image provided by the embodiments of the present disclosure may also be generally performed by the server 105. Accordingly, the apparatus for processing the cell image provided by the embodiments of the present disclosure may generally be arranged in the server 105. The method for processing the cell image provided by the embodiments of the present disclosure may also be performed by a server or server cluster different from the server 105 and capable of communicating with the terminal devices 101, 102, 103 and/or the server 105. Accordingly, the apparatus for processing the cell image provided by the embodiments of the present disclosure may also be provided in a server or server cluster different from the server 105 and capable of communicating with the terminal devices 101, 102, 103 and/or the server 105.

It should be understood that the numbers of terminal devices, networks and servers in FIG. 1 are only schematic. According to the implementation needs, there may be any number of terminal devices, networks and servers.

It should be noted that a sequence number of each operation in the following methods is merely used to represent the operation for ease of description, and should not be regarded as indicating an execution order of each operation. Unless explicitly stated, the methods do not need to be performed exactly in the order shown.

Figure 2:
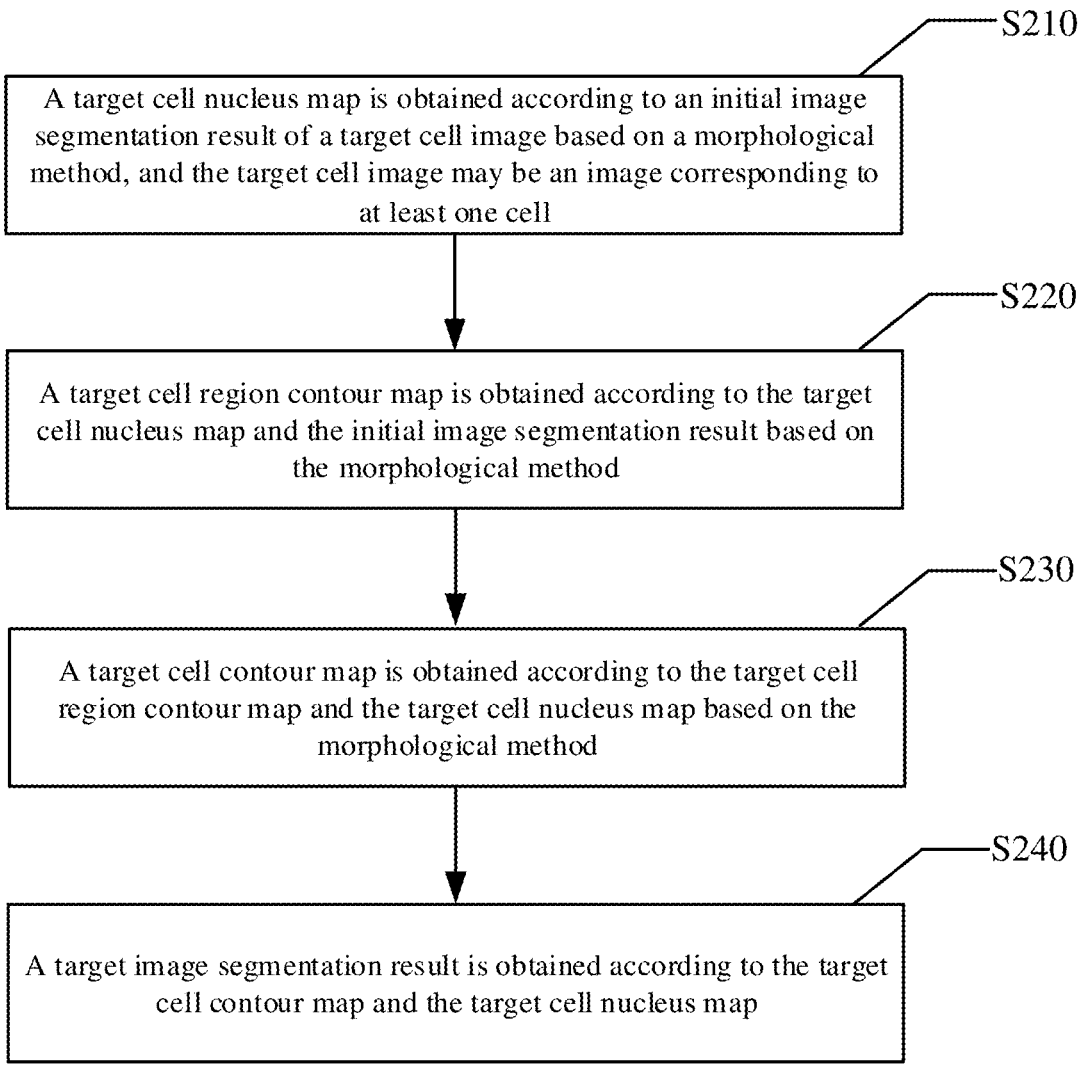
FIG. 2 schematically shows a flowchart of a method for processing a cell image according to the embodiments of the present disclosure.

FIG. 2 schematically shows a flowchart of a method for processing a cell image according to the embodiments of the present disclosure.

As shown in FIG. 2, a method 200 includes operation S210 to operation S240.

In operation S210, a target cell nucleus map is obtained according to an initial image segmentation result of a target cell image based on a morphological method. The target cell image may be an image corresponding to at least one cell.

In operation S220, a target cell region contour map is obtained according to the target cell nucleus map and the initial image segmentation result based on the morphological method.

In operation S230, a target cell contour map is obtained according to the target cell region contour map and the target cell nucleus map based on the morphological method.

In operation S240, a target image segmentation result is obtained according to the target cell contour map and the target cell nucleus map.

According to the embodiments of the present disclosure, cells may include eukaryotic cells and prokaryotic cells. A eukaryotic cell may have cell nucleus, cytoplasm, and cell membrane. In addition, a cell may be divided into a cell edge region, a cell region and a cell nucleus region, according to a magnitude of a pixel value in the cell image. The cell region may include the cell nucleus region.

According to the embodiments of the present disclosure, the cell image may be acquired by using an image acquisition device. For example, the image acquisition device may include a visual sensor and a microscope. The microscope may include at least one of an optical microscope and an electronic microscope. The cell image may be obtained by acquiring a microscopic image of the cell image by using the visual sensor. The microscopic image may be obtained by providing a cell smear under the microscope and adjusting a relative distance between a microscope carrier stage and a microscope objective through a focusing system of the microscope. The cell image may include an image of at least one cell. The cell image may be a gray scale image of cell. The gray scale image of cell may refer to a cell image with a gray value. The target cell image may refer to a cell image that needs an image segmentation.

According to the embodiments of the present disclosure, the morphological method may refer to a method for extracting corresponding information in an image using structural elements based on morphological operations. The morphological method may be used to effectively suppress noise and achieve a simplification of an image on the basis of keeping a basic shape feature of the image. In a case of a continuous movement of structural elements in the image, the morphological method may be used to determine a relationship between portions of the image, so as to achieve the image analysis.

According to the embodiments of the present disclosure, the morphological operation may refer to an operation of connecting adjacent pixels, or separating adjacent pixels into independent pixels. The morphological operation may include at least one of a basic morphological operation and other morphological operations. Other morphological operations may be obtained according to the basic morphological operation. For example, the basic morphological operation may include at least one of a dilation operation and an erosion operation. Other morphological operations may include at least one of: an opening operation, a closing operation, a top hat operation, a bottom hat operation, a morphological gradient operation, or a filling operation. The structural element may be a basic operator of morphology. A rational selection of structural elements plays an important role in improving an effect of image processing using the morphological method. For example, the structural element may be determined according to at least one of a size, a position, a direction and a shape of the structural element.

For example, the shape of the structural element may include at least one of: a line, a square, a rhombus, a disk, or a sphere.

According to the embodiments of the present disclosure, the initial image segmentation result may refer to an image segmentation result in which a segmentation precision of the target cell image is less than or equal to a predetermined segmentation precision threshold. The predetermined segmentation precision threshold may be set according to the actual service requirements, and is not limited here. An initial cell segmentation result may include at least one of: a cell edge map, a cell region map, or a cell nucleus region map.

According to the embodiments of the present disclosure, the target cell nucleus map may refer to the respective cell nucleus image(s) of at least one cell segmented from the target cell image. The cell nucleus images included in the target cell nucleus map may be non-adhesive to each other, that is, the cell nucleus images included in the target cell nucleus map may be independent of each other.

According to the embodiments of the present disclosure, a cell may have a cell contour image corresponding to the cell. The target cell region contour map may refer to a cell region contour image of a cell region segmented from the target cell image. The cell region may contain adhesive cells, and the target cell region contour map may contain cell contour images having an adhesion relationship.

According to the embodiments of the present disclosure, the target cell contour map may include the respective cell contour image(s) of at least one cell. The cell contour images included in the target cell contour map may be non-adhesive to each other, that is, the cell contour images included in the target cell contour map are independent of each other.

According to the embodiments of the present disclosure, the target image segmentation result may refer to an image segmentation result in which a segmentation precision of the target cell image is greater than a predetermined segmentation precision threshold. The target image segmentation result may refer to a cell segmentation result and a cell nucleus segmentation result included in the cell image. The cell segmentation result may be determined according to the target cell contour map. The cell nucleus segmentation result may be determined according to the target cell nucleus map.

According to the embodiments of the present disclosure, a target cell image corresponding to at least one cell may be acquired. An initial image segmentation result may be obtained according to the target cell image corresponding to the at least one cell based on an image segmentation method. The image segmentation method may include at least one of: a thresholding segmentation method, a region segmentation method, or a clustering segmentation method. The region segmentation method may include at least one of: a segmentation method based on region growing and a segmentation method based on region splitting and merging.

According to the embodiments of the present disclosure, the initial image segmentation result and the target cell image may be processed by using the morphological method, so as to obtain a target cell region map. The target cell region map and the initial image segmentation result may be processed by using the morphological method, so as to obtain a target cell nucleus map. The target cell nucleus map, the target cell region map and the target cell image may be processed by using the morphological method, so as to obtain a target cell region contour map. A target cell contour map may be obtained by using the target cell region contour map, the target cell nucleus map and the target cell image.

The target cell contour map and the target cell nucleus map may be used as the target image segmentation result.

According to the embodiments of the present disclosure, the target cell region map, the target cell nucleus map, the target cell region contour map and the target cell contour map may be binary images.

According to the embodiments of the present disclosure, the target image segmentation result is obtained by performing a segmentation on the cell image using the morphological method. With the above operations, an image segmentation result may be obtained without spending manpower for data labeling. In addition, the above operation is independent of the environment in which the cell image is taken, and has a strong robustness.

According to the embodiments of the present disclosure, the above-mentioned method for processing the cell image may further include the following operations.

An original cell image is processed by using an image preprocessing method, so as to obtain the target cell image.

According to the embodiments of the present disclosure, the image preprocessing method may be used to reduce irrelevant information in the original cell image and restore useful information. The image preprocessing method may include at least one of an image enhancement method and a noise filtering method. The image enhancement method may include at least one of: a light compensation method, an edge enhancement method, a contour enhancement method, a texture enhancement method, a target region enhancement method, or a contrast enhancement method. The noise filtering methods may include at least one of: a Gaussian filtering method, an adaptive filtering de-noising method, a median filtering de-noising method, a mean filtering de-noising method, or an image de-noising method based on wavelet transform.

For example, the original cell image may be processed by the Gaussian filtering method to obtain the target cell image, so that a noise of the target cell image may be reduced. Alternatively, the original cell image may be processed by the light compensation method to obtain the target cell image, so that the edge region of the target cell image may be evenly illuminated.

According to the embodiments of the present disclosure, the target cell image is obtained by processing the original cell image using the image preprocessing method, so that a quality of the target cell image may be improved, which may facilitate subsequent operations.

According to the embodiments of the present disclosure, the above-mentioned method for processing the cell image may further include the following operations.

An initial image segmentation result is obtained according to the target cell image based on the thresholding segmentation method. The initial image segmentation result may include a cell edge map, a cell region map and a cell nucleus region map.

According to the embodiments of the present disclosure, the thresholding segmentation method may refer to a method for dividing an image into a background region and at least one foreground region according to a gray scale threshold. For example, the thresholding segmentation method may include one selected from: a thresholding segmentation method based on global threshold, a thresholding segmentation method based on local threshold, or a thresholding segmentation method based on dynamic threshold. The thresholding segmentation method based on global threshold may include at least one of: a fixed-threshold segmentation method, a histogram bimodal method, an iterative-threshold segmentation method, a maximum between-cluster variance method, a gray scale co-occurrence matrix method, or a polynomial fitting method.

According to the embodiments of the present disclosure, the cell edge map may refer to an image of a region in which a gray scale on an outer side of the cell edge of the target cell image is greater than or equal to a predetermined gray scale threshold. The cell region map may refer to an image of the cell region in the target cell image. The cell nucleus region map may refer to an image of the cell nucleus region in the target cell image.

According to the embodiments of the present disclosure, a predetermined threshold may be determined according to a gray value of the target cell image. An image segmentation may be performed on the target cell image according to the predetermined threshold and the gray value of the target cell image, so as to obtain an initial image segmentation result. The predetermined threshold may be a value used to divide the target cell image into a background region and at least one foreground region.

According to the embodiments of the present disclosure, the initial image segmentation result is obtained by performing an image segmentation on the target cell image using the thresholding segmentation method, so that a primary segmentation of the target cell image is achieved.

According to the embodiments of the present disclosure, the thresholding segmentation method may include the maximum between-cluster variance method (i.e., the Otsu's method).

According to the embodiments of the present disclosure, obtaining the initial image segmentation result according to the target cell image based on the thresholding segmentation method may include the following operations.

A first gray scale threshold, a second gray scale threshold and a third gray scale threshold are obtained according to the target cell image, where the second gray scale threshold is greater than the third gray scale threshold and less than the first gray scale threshold. A binarization is performed on the target cell image according to the first gray scale threshold, so as to obtain a cell edge image. A binarization is performed on the target cell image according to the second gray scale threshold, so as to obtain a cell region map. A binarization is performed on the target cell image according to the third gray scale threshold, so as to obtain a cell nucleus region map.

According to the embodiments of the present disclosure, a main idea of the maximum between-cluster variance method is to divide an image into a foreground region and a background region according to a gray scale characteristic of the image. It is possible to determine at least one between-cluster variance between the foreground region and the background region. A maximum between-cluster variance may be determined from the at least one between-cluster variance. A threshold corresponding to the maximum between-cluster variance is determined as a gray scale threshold.

According to the embodiments of the present disclosure, the first gray scale threshold may be obtained by performing a thresholding segmentation on the target cell image within a first predetermined gray scale range based on the maximum between-cluster variance method. The second gray scale threshold may be obtained by performing a thresholding segmentation on the target cell image within a second predetermined gray scale range based on the maximum between-cluster variance method. The second predetermined gray scale range may be determined according to the first gray scale threshold. The third gray scale threshold may be obtained by performing a thresholding segmentation on the target cell image within a third predetermined gray scale range based on the maximum between-cluster variance method. The third predetermined gray scale range may be determined according to the second gray scale threshold. The first predetermined gray scale range may be set according to the actual service requirements, and is not limited here.

For example, the first predetermined gray scale range may be a gray scale range greater than or equal to 0 and less than or equal to 255. The second predetermined gray scale range may be a gray scale range greater than or equal to 0 and less than or equal to the first gray scale threshold. The third predetermined gray scale range may be a gray scale range greater than or equal to 0 and less than or equal to the second gray scale threshold.

A thresholding segmentation may be performed on the target cell image within a first predetermined range based on the maximum between-cluster variance method, so as to determine the first gray scale threshold. A binarization may be performed on the target cell image according to the first gray scale threshold, so as to obtain a cell edge map. For example, a pixel value of a pixel greater than the first gray scale threshold in the target cell image may be set to a second predetermined pixel value, and a pixel value of a pixel less than or equal to the first gray scale threshold in the target cell image may be set to a first predetermined pixel value. The first predetermined pixel value and the second predetermined pixel value may be set according to the actual service requirements, and are not limited here. For example, the first predetermined pixel value may be 0, and the second predetermined pixel value may be 255.

A thresholding segmentation may be performed on the target cell image within a second predetermined range based on the maximum between-cluster variance method, so as to determine the second gray scale threshold. A binarization may be performed on the target cell image according to the second gray scale threshold, so as to obtain a cell region map. For example, a pixel value of a pixel less than the second gray scale threshold in the target cell image may be set to the second predetermined pixel value, and a pixel value of a pixel greater than or equal to the second gray scale threshold in the target cell image may be set to the first predetermined pixel value.

A thresholding segmentation may be performed on the target cell image within a third predetermined range based on the maximum between-cluster variance method, so as to determine the third gray scale threshold. A binarization may be performed on the target cell image according to the third gray scale threshold, so as to obtain a cell region map. For example, a pixel value of a pixel less than the third gray scale threshold in the target cell image may be set to the second predetermined pixel value, and a pixel value of a pixel greater than or equal to the third gray scale threshold in the target cell image may be set to the first predetermined pixel value.

According to the embodiments of the present disclosure, the initial image segmentation result includes the cell edge map, the cell region map, and the cell nucleus region map.

According to the embodiments of the present disclosure, obtaining the target cell nucleus map according to the initial image segmentation result of the target cell image based on the morphological method may include the following operations.

An intermediate cell region map is obtained according to the cell region map and the cell edge map based on the morphological method. At least one connected component cell region map is obtained according to the intermediate cell region map and a predetermined foreground region division strategy. The target cell nucleus map is obtained according to the cell nucleus region map and the at least one connected component cell region map based on the morphological method.

According to the embodiments of the present disclosure, the intermediate cell region map may refer to a cell region map in which a hole in the cell region and a depression at the cell edge are filled and a contour of a cell edge is clear. The predetermined foreground region division strategy may refer to a strategy of performing foreground region division on the intermediate cell region map. For example, the predetermined foreground region division strategy may refer to a strategy of performing foreground region division on the intermediate cell region map based on an area of a connected component region and at least one predetermined area threshold, so as to obtain at least one connected component cell region map. The connected component cell region map may be extracted from the intermediate cell region map.

According to the embodiments of the present disclosure, at least one predetermined region area range may be determined according to the predetermined foreground area division strategy. At least one connected component cell region map may be obtained according to a connected component area in the intermediate cell region map and the at least one predetermined region area range. Each predetermined region area range may have a connected component cell region map corresponding to the predetermined region area range. For example, N predetermined region area ranges may include a predetermined region area range $S_{range_1}$, a predetermined region area threshold $S_{range_2}$, . . . , a predetermined region area threshold $S_{range_n}$, . . . , a predetermined region area threshold $S_{range_{N-1}}$, and a predetermined region area threshold $S_{range_N}$. N may be an integer greater than or equal to 1.

According to the embodiments of the present disclosure, an intermediate cell region map may be obtained according to the cell region map and the cell edge map based on a morphological operation. A target cell nucleus map may be obtained according to the cell nucleus region map and at least one connected component cell region map based on a morphological operation. For example, the morphological operation may include at least one of: an erosion operation, a dilation operation, or a filling operation.

According to the embodiments of the present disclosure, obtaining the intermediate cell region map according to the cell region map and the cell edge map based on the morphological method may include the following operations.

The cell region map is processed by performing a dilation operation, so as to obtain a first dilated cell region map. The first dilated cell region map is processed by performing a filling operation, so as to obtain a dilated and filled cell region map. The dilated and filled cell region map is processed by performing an erosion operation, so as to obtain a filled cell region map. The intermediate cell region map is obtained according to the filled cell region map and the cell edge map.

According to the embodiments of the present disclosure, the first dilated cell region map may be obtained according to a first structural element and the cell region map by performing the dilation operation. The first structural element may be set according to the actual service requirements, and is not limited here. For example, the first structural element may be a first matrix of (M×M), where M may be an integer greater than 1. An element value of an element of the first matrix may be set according to the actual service requirements, and is not limited here. For example, M=2, and the first matrix may be $$\begin{bmatrix} 1 & 1 \\ 1 & 1 \end{bmatrix}.$$

According to the embodiments of the present disclosure, a hole region in the dilated cell region map may be filled by performing the filling operation, so as to obtain the dilated and filled cell region map.

According to the embodiments of the present disclosure, the filled cell region map may be obtained by performing the erosion operation according to a second structural element and the dilated and filled cell region map. The second structure element may be set according to the actual service requirements, and is not limited here. For example, the second structural element may be the same as the first structural element. For example, a second matrix may be $$\begin{bmatrix} 1 & 1 \\ 1 & 1 \end{bmatrix}.$$

According to the embodiments of the present disclosure, after the filled cell region map is obtained, an intermediate cell region map in which the target cell edge is removed may be obtained according to the filled cell region map and the cell edge map.

According to the embodiments of the present disclosure, the dilation operation is performed on the cell region map to obtain the first dilated cell region map, the filling operation is performed on the first dilated cell region map to obtain the dilated and filled cell region map, and then the erosion operation is performed on the dilated and filled cell region map to obtain the filled cell region map, so that a small hole in the cell region and a depression at the edge may be effectively filled, a long and thin gap and a narrow disconnection may be eliminated, and a contour of the image may be smoothed, thereby improving a cell integrity after the image segmentation. On this basis, the intermediate cell region map may be obtained by subtracting the cell edge map from the filled cell region map, so that the intermediate cell region map has a clearer cell edge contour, which may help to improve an accuracy of the target image segmentation result.

According to the embodiments of the present disclosure, obtaining the intermediate cell region map according to the filled cell region map and the cell edge map may include the following operations.

A target cell edge in the filled cell region map is removed according to the filled cell region map and the cell edge map, so as to obtain the intermediate cell region map.

According to the embodiments of the present disclosure, the target cell edge may refer to a cell edge which is incorrectly recognized in the cell edge map. The incorrectly recognized cell edge may include at least one of: a recognized cell edge that is not actually a cell edge, and an actual cell edge that is not recognized as a cell edge.

According to the embodiments of the present disclosure, the intermediate cell region map may be obtained by performing the subtraction operation on the filled cell region map and the cell edge map. For example, the intermediate cell region map may be obtained by subtracting the cell edge map from the filled cell region map.

According to the embodiments of the present disclosure, the intermediate cell region map may be obtained by removing the target cell edge, which is an incorrectly recognized cell edge, in the filled cell region map, so that the intermediate cell region map has a clearer cell edge contour, which may help to improve the accuracy of the target image segmentation result.

According to the embodiments of the present disclosure, obtaining the target cell nucleus map according to the cell nucleus region map and the at least one connected component cell region map based on the morphological method may include the following operations.

A cell nucleus map corresponding to a connected component cell region map in the at least one connected component cell region map is obtained according to the cell nucleus region map and the connected component cell region map based on the morphological method. The target cell nucleus map is obtained according to the cell nucleus maps respectively corresponding to the at least one connected component cell region map.

According to the embodiments of the present disclosure, the connected component cell region map and the cell nucleus region map may be processed by using the morphological method, so as to obtain the cell nucleus map corresponding to each connected component cell region map in the at least one connected component cell region map. Then, the cell nucleus maps respectively corresponding to the at least one connected component cell region map may be obtained. The cell nucleus maps respectively corresponding to the at least one connected component cell region map may be merged to obtain the target nucleus map. For example, the cell nucleus maps respectively corresponding to the at least one connected component cell region map may be added to obtain the target cell nucleus map.

According to the embodiments of the present disclosure, obtaining the cell nucleus map corresponding to the connected component cell region map according to the cell nucleus region map and the connected component cell region map based on the morphological method may include the following operations.

When it is determined that an area of the connected component cell region map is greater than or equal to a first predetermined area threshold, the connected component cell region map is processed based on the morphological method, so as to obtain an intermediate connected component cell region map, and the cell nucleus map corresponding to the connected component cell region map is obtained according to the intermediate connected component cell region map and the cell nucleus region map. When it is determined that the area of the connected component cell region map is less than the first predetermined area threshold, the cell nucleus map corresponding to the connected component cell region map is obtained according to the cell nucleus region map and the connected component cell region map.

According to the embodiments of the present disclosure, the first predetermined area threshold may be used as a basis for determining whether there is a need to perform a morphological operation on the connected component cell region map. The first predetermined area threshold may be set according to the actual service requirements, and is not limited here.

According to the embodiments of the present disclosure, the area of each connected component cell region map in the at least one connected component cell region map may be determined. When it is determined that the area of the connected component cell region map is greater than or equal to the first predetermined area threshold, it indicates a high degree of cell adhesion in the connected component cell region map. In this case, the erosion operation may be performed to obtain the intermediate connected component cell region map according to the connected component cell region map and a third structural element corresponding to the connected component cell region map. The third structural element may be provided according to the actual service requirements, and is not limited here. For example, the third structural element corresponding to the connected component cell region map may be determined according to the area of the connected component cell region map. The larger the area of the connected component cell region map, the larger the size of the third structural element corresponding to the connected component cell region map. After the intermediate connected component cell region map is obtained, the cell nucleus map corresponding to the connected component cell region map may be obtained according to the intermediate connected component cell region map and the cell nucleus region map.

According to the embodiments of the present disclosure, when it is determined that the area of the connected component cell region map is less than the first predetermined area threshold, the cell nucleus map corresponding to the connected component cell region map may be obtained according to the connected component cell region map and the cell nucleus region map.

According to the embodiments of the present disclosure, obtaining the cell nucleus map corresponding to the connected component cell region map according to the intermediate connected component cell region map and the cell nucleus region map may include the following operations.

An AND operation is performed on the intermediate connected component cell region map and the cell nucleus region map, so as to obtain a first intersection cell region map. The cell nucleus map corresponding to the connected component cell region map is obtained according to the first intersection cell region map and the intermediate connected component cell region map.

According to the embodiments of the present disclosure, the first intersection cell region map may refer to an image corresponding to an intersection region between the intermediate connected component cell region map and the cell nucleus region map. Since the intermediate connected component cell region map may be obtained by performing the erosion operation on the connected component cell region map corresponding to the intermediate connected component cell region map, it is possible that one cell is divided into at least two cells in the intermediate connected component cell region map. Since the cell nucleus region map is an image containing nucleus, a region of the intermediate connected component cell region map intersecting with the cell nucleus region map may be retained by performing the AND operation on the intermediate connected component cell region map and the cell nucleus region map. As the cell nucleus region map is an image containing nucleus, a probability that the first intersection cell region map contains a cell nucleus may be improved, and a noise interference to the first intersection cell region map may be reduced.

According to the embodiments of the present disclosure, after the first intersection cell region map is obtained, a first candidate cell nucleus map corresponding to the connected component cell region map may be obtained according to the first intersection cell region map and the intermediate connected component cell region map. The cell nucleus map corresponding to the connected component cell region map may be obtained according to the first candidate cell nucleus map corresponding to the connected component cell region map. For example, a connected component of the intermediate connected component cell region map that is located in the first intersection cell region map may be retained and other regions may be removed according to the first intersection cell region map and the intermediate connected component cell region map, so as to obtain the first candidate cell nucleus map corresponding to the connected component cell region map.

According to the embodiments of the present disclosure, obtaining the cell nucleus map corresponding to the connected component cell region map according to the first intersection cell region map and the intermediate connected component cell region map may include the following operations.

A first template image is generated, where a size of the first template image is equal to a size of the intermediate connected component cell region map, and a pixel value of a pixel of the first template image is a first predetermined pixel value. A first candidate cell nucleus map corresponding to the connected component cell region map is obtained according to the first template image, the first intersection cell region map, and the intermediate connected component cell region map. The cell nucleus map corresponding to the connected component cell region map is obtained according to the first candidate cell nucleus map corresponding to the connected component cell region map.

According to the embodiments of the present disclosure, the first template image may be an image of which the pixel value is the first predetermined pixel value and of which the size is equal to the size of the intermediate connected component cell region map. The first template image may be processed according to the first intersection cell region map and the intermediate connected component cell region map, so as to obtain the first candidate cell nucleus map corresponding to the connected component cell region map.

According to the embodiments of the present disclosure, after the first candidate cell nucleus map is obtained, a first target connected component may be removed from the first candidate cell nucleus map, so as to obtain a first candidate cell nucleus map in which the first target connected component is removed. The first candidate cell nucleus map in which the first target connected component is removed may be determined as the cell nucleus map. The first target connected component may refer to a connected component of which an area meets a first predetermined area condition. For example, the first target connected component may refer to a connected component of which the area is less than a second predetermined area threshold.

According to the embodiments of the present disclosure, obtaining the first candidate cell nucleus map corresponding to the connected component cell region map according to the first template image, the first intersection cell region map and the intermediate connected component cell region map may include the following operations.

A first contour set corresponding to the connected components in the first intersection cell region map is obtained. Each first predetermined pixel of the first contour set is traversed, and the pixel values of the pixels, which have the same label as the first predetermined pixels, in the first template image, are changed from the first predetermined pixel value to a second predetermined pixel value, until the traversal is completed, so as to obtain the first candidate cell nucleus map corresponding to the connected component cell region map. The label of the first predetermined pixel in the first template image is determined according to the label of the first predetermined pixel in the intermediate connected component cell region map.

According to the embodiments of the present disclosure, a label may be used to represent a connected component. Each connected component has a label corresponding to the connected component, and the connected components may correspond to the labels respectively. A pixel of the first template image has a label corresponding to that pixel, and pixels, which belong to the same connected component, in the first template image, have the same label. A pixel of the intermediate connected component cell region map has a label corresponding to that pixel, and pixels, which belong to the same connected component, in the intermediate connected component cell region map, have the same label. A label may be associated with a position of a pixel.

According to the embodiments of the present disclosure, it is possible to determine contours respectively corresponding to all connected components of the first intersection cell region map, so as to obtain the first contour set. The first contour set may include at least one first contour. Each first contour may have a plurality of pixels corresponding to the first contour. Each first contour may have a first predetermined pixel corresponding to the first contour. The first predetermined pixel corresponding to the first contour may be determined from the plurality of pixels corresponding to the first contour. The first predetermined pixel may be selected according to the actual service requirements, and is not limited here. For example, the first predetermined pixel corresponding to the first contour may be the first pixel in the plurality of pixels corresponding to the first contour. Alternatively, the first predetermined pixel corresponding to the first contour may be a pixel in a central region of the plurality of pixels corresponding to the first contour.

According to the embodiments of the present disclosure, the first predetermined pixel corresponding to each first contour in the first contour set is determined. The label corresponding to the first predetermined pixel of the first contour is determined according to a position of the first predetermined pixel and an association relationship between the label and the position of the pixel. The respective positions of the plurality of pixels, which have the same label as the first predetermined pixel of the first contour, in the first template image, are determined according to the label corresponding to the first predetermined pixel of the first contour and the association relationship between the label and the position of the pixel. The respective pixel values of the plurality of pixels having the same label as the first predetermined pixel of the first contour are changed from the first predetermined pixel value to the second predetermined pixel value according to the respective positions of the plurality of pixels having the same label as the first predetermined pixel of the first contour. The first contour set is traversed based on the above method, so as to obtain the first candidate cell nucleus map corresponding to the connected component cell region map.

According to the embodiments of the present disclosure, since the cell nucleus region map is an image containing cell nucleus, the intermediate connected component cell region map is required to contain connected component(s) in the cell nucleus region map if the connected component of the intermediate connected component cell region map is a valid connected component. Therefore, the first intersection cell region map intersecting with the cell nucleus region map may be obtained by performing an AND operation on the intermediate connected component cell region map and the cell nucleus region map. By traversing each first predetermined pixel of the first contour set in the first intersection cell region map, and changing the pixel values of the pixels, which have the same label as the first predetermined pixel, in the first template image, from the first predetermined pixel value to the second predetermined pixel value until the traversal is completed, the probability that the first candidate cell nucleus map contains a cell nucleus may be increased, and the noise interference to the first candidate cell nucleus map may be reduced. In addition, it is also possible to restore a nucleus morphology, so that the nucleus morphology may be close to a true nucleus morphology.

According to the embodiments of the present disclosure, obtaining the first candidate cell nucleus map corresponding to the connected component cell region map according to the first template image, the first intersection cell region map and the intermediate connected component cell region map may include the following operations.

Each second predetermined pixel in the first template image is traversed, and the pixel values of pixels, which have the same label as the second predetermined pixel, in the first template image, is changed from the first predetermined pixel value to the second predetermined pixel value in a case that the pixel corresponding to the second predetermined pixel, in the first intersection cell region map, is determined to have an expected pixel value, until the traversal is completed, so as to obtain the first candidate cell nucleus map corresponding to the connected component cell region map. The label of the second predetermined pixel in the first template image is determined according to the label of the second predetermined pixel in the intermediate connected component cell region map.

According to the embodiments of the present disclosure, the expected pixel value may be set according to the actual service requirements, and is not limited here. For example, the expected pixel value may be the second predetermined pixel value. The second predetermined pixel may be any one of the pixels in the first template image.

According to the embodiments of the present disclosure, for each second predetermined pixel in the first template image, it is determined whether the pixel corresponding to the second predetermined pixel, in the first intersection cell region map, has the expected pixel value. When it is determined that the pixel value of the pixel corresponding to the second predetermined pixel, in the first intersection cell region map, has the expected pixel value, the respective positions of a plurality of pixels, which have the same label as the second predetermined pixel, in the first template image, may be determined according to the label corresponding to the second predetermined pixel and the association relationship between the label and the positions of the pixels. The respective pixel values of the plurality of pixels, which have the same label as the second predetermined pixel, in the first template image, may be changed from the first predetermined pixel value to the second predetermined pixel value according to the respective positions of the plurality of pixels, which have the same label as the second predetermined pixel, in the first template image.

According to the embodiments of the present disclosure, by traversing each second predetermined pixel in the first template image, and changing the pixel values of the pixels, which have the same label as the second predetermined pixel, in the first template image, from the first predetermined pixel value to the second predetermined pixel value until the traversal is completed in a case of determining that the pixel corresponding to the second predetermined pixel, in the first intersection cell region map, has the expected pixel value, the probability that the first candidate cell nucleus map contains a cell nucleus may be increased, and the noise interference to the first candidate cell nucleus map may be reduced. In addition, it is also possible to restore a nucleus morphology, so that the nucleus morphology may be close to a true nucleus morphology.

According to the embodiments of the present disclosure, the first candidate cell nucleus map may include at least one first candidate connected component, and the cell nucleus map may include at least one connected component.

According to the embodiments of the present disclosure, obtaining the cell nucleus map corresponding to the connected component cell region map according to the first candidate cell nucleus map corresponding to the connected component cell region map may include the following operations.

For each first candidate connected component in the first candidate cell nucleus map corresponding to the connected component cell region map, the first candidate connected component whose area is determined to be greater than or equal to a second predetermined area threshold is determined as the connected component in the cell nucleus map corresponding to the connected component cell region map.

According to the embodiments of the present disclosure, the second predetermined area threshold may be set according to the actual service requirements, and is not limited here. For example, the second predetermined area threshold may be 20 $\mu m^2$.

According to the embodiments of the present disclosure, the connected component in the cell nucleus map has a connected component area greater than or equal to the second predetermined area threshold, so that a connected component with small area, which may interfere with the image segmentation, in the cell nucleus map, may be effectively eliminated. Therefore, the accuracy of the image segmentation result may be improved by using the first candidate connected component having a connected component area greater than or equal to the second predetermined area threshold as the connected component in the cell nucleus map.

According to the embodiments of the present disclosure, obtaining the cell nucleus map corresponding to the connected component cell region map according to the cell nucleus region map and the connected component cell region map may include the following operations.

An AND operation is performed on the connected component cell region map and the cell nucleus region map to obtain a second intersection cell region map. The cell nucleus map corresponding to the connected component cell region map is obtained according to the second intersection cell region map and the connected component cell region map.

According to the embodiments of the present disclosure, the second intersection cell region map may refer to an image corresponding to an intersection region between the connected component cell region map and the cell nucleus region map.

According to the embodiments of the present disclosure, after the second intersection cell region map is obtained, a second candidate cell nucleus map corresponding to the connected component cell region map may be obtained according to the second intersection cell region map and the connected component cell region map. The cell nucleus map corresponding to the connected component cell region map may be obtained according to the second candidate cell nucleus map corresponding to the connected component cell region map. For example, the connected component of the second intersection cell region map, located in the connected component cell region map, may be retained and other regions may be removed according to the second intersection cell region map and the connected component cell region map, so as to obtain the second candidate cell nucleus map corresponding to the connected component cell region map.

According to the embodiments of the present disclosure, obtaining the cell nucleus map corresponding to the connected component cell region map according to the second intersection cell region map and the connected component cell region map may include the following operations.

A second template image is generated, where a size of the second template image is equal to the size of the connected component cell region map, and a pixel value of a pixel of the second template image is the first predetermined pixel value. The second candidate cell nucleus map corresponding to the connected component cell region map is obtained according to the second template image, the second intersection cell region map and the connected component cell region map. The cell nucleus map corresponding to the connected component cell region map is obtained according to the second candidate cell nucleus map corresponding to the connected component cell region map.

According to the embodiments of the present disclosure, the second template image may be an image of which the pixel value is the first predetermined pixel value and of which the size is equal to the size of the connected component cell region map. The second template image may be processed according to the second intersection cell region map and the connected component cell region map, so as to obtain the second candidate cell nucleus map corresponding to the connected component cell region map.

According to the embodiments of the present disclosure, after the second candidate cell nucleus map is obtained, a second target connected component may be removed from the second candidate cell nucleus map, so as to obtain a second candidate cell nucleus map in which the second target connected component is removed. The second candidate cell nucleus map in which the second target connected component is removed may be determined as the cell nucleus map. The second target connected component may refer to a connected component of which the area meets a second predetermined area condition. For example, the second target connected component may refer to a connected component of which the area is less than a third predetermined area threshold.

According to the embodiments of the present disclosure, obtaining the second candidate cell nucleus map corresponding to the connected component cell region map according to the second template image, the second intersection cell region map and the connected component cell region map may include the following operations.

A second contour set corresponding to the connected components in the second intersection cell region map is determined. Each third predetermined pixel of the second contour set is traversed, and the pixel values of the pixels, which have the same label as the third predetermined pixel, in the second template image, are changed from the first predetermined pixel value to the second predetermined pixel value until the traversal is completed, so as to obtain the second candidate cell nucleus map corresponding to the connected component cell region map. The label of the third predetermined pixel in the second template image is determined according to the label of the third predetermined pixel in the connected component cell region map.

According to the embodiments of the present disclosure, the label may be used to represent the connected component. Each connected component has a label corresponding to the connected component, and the connected components may correspond to the labels respectively. A pixel of the second template image has a label corresponding to that pixel, and pixels, which belong to the same connected component, in the second template image, have the same label. A pixel of the connected component cell region map has a label corresponding to that pixel, and pixels, which belong to the same connected component, in the connected component cell region map, have the same label. A label may be associated with a position of a pixel.

According to the embodiments of the present disclosure, it is possible to determine contours respectively corresponding to all connected components of the second intersection cell region map, so as to obtain the second contour set. The second contour set may include at least one second contour. Each second contour may have a plurality of pixels corresponding to the second contour. Each second contour may have a third predetermined pixel corresponding to the second contour. The third predetermined pixel corresponding to the second contour may be determined from the plurality of pixels corresponding to the second contour. The third predetermined pixel may be selected according to the actual service requirements, and is not limited here. For example, the third predetermined pixel corresponding to the second contour may be the first pixel in the plurality of pixels corresponding to the second contour. Alternatively, the third predetermined pixel corresponding to the second contour may be a pixel in a central region of the plurality of pixels corresponding to the second contour.

According to the embodiments of the present disclosure, the third predetermined pixel corresponding to each second contour in the second contour set is determined. The label corresponding to the third predetermined pixel of the second contour is determined according to a position of the third predetermined pixel and an association relationship between the label and the position of the pixel. The respective positions of the plurality of pixels, which have the same label as the third predetermined pixel of the second contour, in the second template image, are determined according to the label corresponding to the third predetermined pixel of the second contour and the association relationship between the label and the position of the pixel. The respective pixel values of the plurality of pixels having the same label as the third predetermined pixel of the second contour are changed from the first predetermined pixel value to the second predetermined pixel value according to the respective positions of the plurality of pixels having the same label as the third predetermined pixel of the second contour. The second contour set is traversed based on the above method, so as to obtain the second candidate cell nucleus map corresponding to the connected component cell region map.

According to the embodiments of the present disclosure, since the cell nucleus region map is an image containing cell nucleus, the connected component cell region map is required to contain connected component(s) in the cell nucleus region map if the connected component of the connected component cell region map is a valid connected component. Therefore, the second intersection cell region map intersecting with the cell nucleus region map may be obtained by performing an AND operation on the connected component cell region map and the cell nucleus region map. By traversing each third predetermined pixel of the second contour set in the second intersection cell region map, and changing the pixel values of the pixels, which have the same label as the third predetermined pixel, in the second template image, from the first predetermined pixel value until the traversal is completed, the probability that the second candidate cell nucleus map contains a cell nucleus may be increased, and the noise interference to the second candidate cell nucleus map may be reduced. In addition, it is also possible to restore a nucleus morphology, so that the nucleus morphology may be close to a true nucleus morphology.

According to the embodiments of the present disclosure, obtaining the second candidate cell nucleus map corresponding to the connected component cell region map according to the second template image, the second intersection cell region map and the connected component cell region map may include the following operations.

Each fourth predetermined pixel in the second template image is traversed, and the pixel values of the pixels, which have the same label as the fourth predetermined pixel, in the second template image, are changed from the first predetermined pixel value to the second predetermined pixel value in a case that the pixel corresponding to the fourth predetermined pixel, in the first intersection cell region map, is determined to have an expected pixel, until the traversal is completed, so as to obtain the second candidate cell nucleus map corresponding to the connected component cell region map. The label of the fourth predetermined pixel in the second template image is determined according to the label of the fourth predetermined pixel in the connected component cell region map.

According to the embodiments of the present disclosure, the expected pixel value may be set according to the actual service requirements, and is not limited here. For example, the expected pixel value may be the second predetermined pixel value. The fourth predetermined pixel may be any one of the pixels in the second template image.

According to the embodiments of the present disclosure, for each fourth predetermined pixel in the second template image, it is determined whether the pixel, which corresponds to the fourth predetermined pixel, in the second intersection cell region map, has an expected pixel value. When it is determined that the pixel corresponding to the fourth predetermined pixel, in the second intersection cell region map, has the expected pixel value, the respective positions of a plurality of pixels, which have the same label as the fourth predetermined pixel, in the second template image, may be determined according to the label corresponding to the fourth predetermined pixel and the association relationship between the label and the positions of the pixels. The respective pixel values of the plurality of pixels, which have the same label as the fourth predetermined pixel, in the second template image, may be changed from the first predetermined pixel value to the second predetermined pixel value according to the respective positions of the plurality of pixels, which have the same label as the fourth predetermined pixel, in the second template image.

According to the embodiments of the present disclosure, by traversing each fourth predetermined pixel in the second template image, and changing the pixel values of the pixels, which have the same label as the fourth predetermined pixel, in the second template image, from the first predetermined pixel value to the second predetermined pixel value until the traversal is completed in a case of determining that the pixel corresponding to the fourth predetermined pixel, in the second intersection cell region map, has the expected pixel value, the probability that the second candidate cell nucleus map contains a cell nucleus may be increased, and the noise interference to the second candidate cell nucleus map may be reduced. In addition, it is also possible to restore a nucleus morphology, so that the nucleus morphology may be close to a true nucleus morphology.

According to the embodiments of the present disclosure, the second candidate cell nucleus map may include at least one second candidate connected component, and the cell nucleus map may include at least one connected component.

According to the embodiments of the present disclosure, obtaining the cell nucleus map corresponding to the connected component cell region map according to the second candidate cell nucleus map corresponding to the connected component cell region map may include the following operations.

For each second candidate connected component in the second candidate cell nucleus map corresponding to the connected component cell region map, the second candidate connected component whose area is determined to be greater than or equal to a third predetermined area threshold is determined as the connected component in the cell nucleus map corresponding to the connected component cell region map.

According to the embodiments of the present disclosure, the third predetermined area threshold may be set according to the actual service requirements, and is not limited here. For example, the third predetermined area threshold may be 70 $\mu m^2$.

According to the embodiments of the present disclosure, the connected component in the cell nucleus map has a connected component area greater than or equal to the third predetermined area threshold, so that a connected component with small area, which may interfere with the image segmentation, in the cell nucleus map, may be effectively eliminated. Therefore, the accuracy of the image segmentation result may be improved by using the second candidate connected component with having a connected component area greater than or equal to the third predetermined area threshold as the connected component in the cell nucleus map.

According to the embodiments of the present disclosure, the initial image segmentation result may include a cell edge map and a cell region map.

According to the embodiments of the present disclosure, obtaining the target cell region contour map according to the target cell nucleus map and the initial image segmentation result based on the morphological method may include the following operations.

A primary cell region map is obtained according to the target cell nucleus map and the cell region map. The primary cell region map is processed by performing a dilation operation, so as to obtain a second dilated cell region map. A first intermediate cell region contour map is obtained according to the second dilated cell region map and the primary cell region map. A second intermediate cell region contour map is obtained according to the first intermediate cell region contour map and the target cell image. A third intermediate cell region contour map is obtained according to the second intermediate cell region contour map and the target cell nucleus map. The target cell region contour map is obtained according to the third intermediate cell region contour map and the cell edge map.

According to the embodiments of the present disclosure, the primary cell region map may be obtained by adding the target cell nucleus map and the cell region map. After the primary cell region map is obtained, a dilation operation may be performed, so as to obtain the second dilated cell region map according to a fourth structural element and the primary cell region map. The fourth structural element may be set according to the actual service requirements, and is not limited here.

According to the embodiments of the present disclosure, the first intermediate cell region contour map may be obtained by performing a subtraction operation on the primary cell region map and the second dilated cell region map. The second dilated cell region map may be used as a background, and the primary cell region map may be used as a foreground.

According to the embodiments of the present disclosure, an AND operation may be performed on the second intermediate cell region contour map and the target cell nucleus map, so as to obtain an intersection region between the second intermediate cell region contour map and the target cell nucleus map. The third intermediate cell region contour map may be obtained by retaining the connected component of the second intermediate cell region contour map located in the intersection region, and removing other regions other than the intersection region.

According to the embodiments of the present disclosure, the target cell region contour map may be obtained by performing a subtraction operation on the third intermediate cell region contour map and the cell edge map. For example, the target cell region contour map may be obtained by subtracting the cell edge map from the third intermediate cell region contour map.

According to the embodiments of the present disclosure, obtaining the second intermediate cell region contour map according to the first intermediate cell region contour map and the target cell image may include the following operations.

A watershed processing is performed on the first intermediate cell region contour map based on the target cell image, so as to obtain a fourth intermediate cell region contour map. A pixel value of a pixel of a background region in the fourth intermediate cell region contour map is set to the first predetermined pixel value, and the pixel value of the pixel in other regions other than the background region in the fourth intermediate cell region contour map is set to the second predetermined pixel value, so as to obtain the second intermediate cell region contour map.

According to the embodiments of the present disclosure, the watershed method may include at least one of: a watershed segmentation method based on distance transformation, a watershed segmentation method based on marker, or a watershed segmentation method based on gradient. The watershed method may be configured according to the actual service requirements, and is not limited here.

According to the embodiments of the present disclosure, the fourth intermediate cell region contour map may be obtained by performing the watershed processing on the first intermediate cell region contour map on the target cell image. The first predetermined pixel value and the second predetermined pixel value may be set according to the actual service requirements, and are not limited here. For example, the first predetermined pixel value may be 0, and the second predetermined pixel value may be 255.

According to the embodiments of the present disclosure, obtaining the third intermediate cell region contour map according to the second intermediate cell region contour map and the target cell nucleus map may include the following operations.

A third template image is generated, where a size of the third template image is equal to the size of the second intermediate cell region contour map, and a pixel value of a pixel of the third template image is the first predetermined pixel value. The third intermediate cell region contour map is obtained according to the third template image, the second intermediate cell region contour map and the target cell nucleus map.

According to the embodiments of the present disclosure, the third template image may be an image of which the pixel value is the first predetermined pixel value and of which the size is equal to the size of the second intermediate cell region contour map.

According to the embodiments of the present disclosure, obtaining the third intermediate cell region contour map according to the third template image, the second intermediate cell region contour map and the target cell nucleus map may include the following operations.

A third contour set corresponding to the connected components in the target cell nucleus map is determined. Each fifth predetermined pixel of the third contour set is traversed, and the pixel values of the pixels, which have the same label as the fifth predetermined pixel, in the third template image, are changed from the first predetermined pixel value to the second predetermined pixel value until the traversal is completed, so as to obtain the third intermediate cell region contour map. The label of the fifth predetermined pixel in the third template image is determined according to the label of the fifth predetermined pixel in the second intermediate cell region contour map.

According to the embodiments of the present disclosure, a label may be used to represent a connected component. Each connected component has a label corresponding to the connected component, and the connected components may correspond to the labels respectively. A pixel of the third template image has a label corresponding to that pixel, and pixels, which belong to the same connected component, in the third template image, have the same label. A pixel of the second intermediate cell region contour map has a label corresponding to that pixel, and pixels, which belong to the same connected component, in the second intermediate cell region contour map, have the same label. A label may be associated with a position of a pixel.

According to the embodiments of the present disclosure, it is possible to determine contours respectively corresponding to all connected components of the target cell nucleus map, so as to obtain the third contour set. The third contour set may include at least one third contour. Each third contour may have a plurality of pixels corresponding to the third contour. Each third contour may have a fifth predetermined pixel corresponding to the third contour. The fifth predetermined pixel corresponding to the third contour may be determined from the plurality of pixels corresponding to the third contour. The fifth predetermined pixel may be selected according to the actual service requirements, and is not limited here. For example, the fifth predetermined pixel corresponding to the third contour may be the first pixel in the plurality of pixels corresponding to the third contour. Alternatively, the fifth predetermined pixel corresponding to the third contour may be a pixel in a central region of the plurality of pixels corresponding to the third contour.

According to the embodiments of the present disclosure, the fifth predetermined pixel corresponding to each third contour in the third contour set is determined. The label corresponding to the fifth predetermined pixel of the third contour is determined according to a position of the fifth predetermined pixel and an association relationship between the label and the position of the pixel. The respective positions of the plurality of pixels, which have the same label as the fifth predetermined pixel of the third contour, in the third template image, are determined according to the label corresponding to the fifth predetermined pixel of the third contour and the association relationship between the label and the position of the pixel. The respective pixel values of the plurality of pixels having the same label as the fifth predetermined pixel of the third contour are changed from the first predetermined pixel value to the second predetermined pixel value according to the respective positions of the plurality of pixels having the same label as the fifth predetermined pixel of the third contour. The third contour set is traversed based on the above method, so as to obtain the third intermediate cell region contour map.

According to the embodiments of the present disclosure, since the cell nucleus region map is an image containing cell nucleus, the probability that the third intermediate cell region contour map contains a cell nucleus may be increased and the noise interference to the third intermediate cell region contour map may be reduced by traversing each fifth predetermined pixel of the third contour set corresponding to the connected component in the target cell nucleus map and changing the pixel values of the pixels, which have the same label as the fifth predetermined pixel, in the third template image, from the first predetermined pixel value to the second predetermined pixel value until the traversal is completed.

According to the embodiments of the present disclosure, obtaining the third intermediate cell region contour map according to the third template image, the second intermediate cell region contour map and the target cell nucleus map may include the following operations.

Each sixth predetermined pixel in the third template image is traversed, and the pixel values of the pixels, which have the same label as the sixth predetermined pixel, in the third template image, are changed from the first predetermined pixel value to the second predetermined pixel value, when it is determined that the pixel corresponding to the sixth predetermined pixel, in the target cell nucleus map, has an expected pixel value, until the traversal is completed, so as to obtain the third intermediate cell region contour map.

According to the embodiments of the present disclosure, the expected pixel value may be set according to the actual service requirements, and is not limited here. For example, the expected pixel value may be the second predetermined pixel value. The sixth predetermined pixel may be any one of the pixels in the third template image.

According to the embodiments of the present disclosure, for each sixth predetermined pixel in the third template image, it is determined whether the pixel, corresponding to the sixth predetermined pixel, in the target cell nucleus map, has the expected pixel value. When it is determined that the pixel, corresponding to the sixth predetermined pixel, in the target cell nucleus map, has the expected pixel value, the respective positions of a plurality of pixels, which have the same label as the sixth predetermined pixel, in the third template image, may be determined according to the label corresponding to the sixth predetermined pixel and the association relationship between the label and the positions of the pixels. The respective pixel values of the plurality of pixels, which have the same label as the sixth predetermined pixel, in the third template image, may be changed from the first predetermined pixel value to the second predetermined pixel value according to the respective positions of the plurality of pixels, which have the same label as the sixth predetermined pixel, in the third template image.

According to the embodiments of the present disclosure, by traversing each sixth predetermined pixel in the third template image, and changing the pixel values of the pixels, which have the same label as the sixth predetermined pixel, in the third template image, from the first predetermined pixel value to the second predetermined pixel value until the traversal is completed in a case of determining that the pixel corresponding to the sixth predetermined pixel, in the target cell nucleus map, has the expected pixel value, the probability that the third intermediate cell region contour map contains a cell nucleus may be increased, and the noise interference to the third intermediate cell region contour map may be reduced.

According to the embodiments of the present disclosure, obtaining the target cell contour map according to the target cell region contour map and the target cell nucleus map based on the morphological method may include the following operations.

A subtraction operation is performed on the target cell region contour map and the target cell nucleus map to obtain an intermediate cell contour map. A watershed processing is performed on the intermediate cell contour map based on the target cell image, so as to obtain the target cell region contour map.

According to the embodiments of the present disclosure, the target cell region contour map may be used as a background, and the target cell nucleus map may be used as a foreground. The target cell contour map may be obtained by performing a watershed processing on the intermediate cell contour map on the target cell image.

According to the embodiments of the present disclosure, the above-mentioned method for processing the cell image may further include the following operations.

A cell statistical information is determined according to the target image segmentation result. A cell quality evaluation result is determined according to the cell statistical information.

According to the embodiments of the present disclosure, the cell statistical information includes at least one of: a cell quantity, a cell area, a cell circumference, a total cell area, a long axis length of cell, or a short axis length of cell.

According to the embodiments of the present disclosure, a cell statistical analysis routine may be called, and the target image segmentation result may be processed using the cell statistical analysis routine, so as to obtain the cell statistical information. For example, the cell statistical analysis routine may include at least one of: a circumference statistical routine, an area statistical routine, a cell quantity statistical routine, and a long axis and short axis statistical routine. For example, the circumference statistical routine may be cv2.arcLength( ), and the area statistical routine may be cv2.contourArea( ).

According to the embodiments of the present disclosure, the cell quantity may be determined according to the target cell nucleus map by using the cell quantity statistical routine. The cell area may be obtained according to the target cell contour map by using the area statistical routine. The cell circumference may be obtained according to the target cell contour map by using the circumference statistical routine. The long axis length of cell and the short axis length of cell may be obtained according to the target cell contour map by using the long axis and short axis statistical routine. The total cell area may be obtained according to the cell quantity and the cell area.

According to the embodiments of the present disclosure, the cell quality evaluation result may be determined according to the cell statistical information.

According to the embodiments of the present disclosure, the target image segmentation result is obtained by performing a segmentation on the cell image by using the morphological method, and the cell quality is evaluated according to the target image segmentation result. The quality evaluation result may avoid an error caused by a human factor, and a cell culture process may be further standardized, so that the production costs may be effectively reduced. In an actual industrial production, it is possible to achieve a rapid analysis of continuous target cell images with a statistical accuracy of 90% or above.

The method for processing the cell image described in the embodiments of the present disclosure will be further described in combination with specific embodiments with reference to FIG. 3A to FIG. 3B and FIG. 4A to FIG. 4K.

Figure 3A:
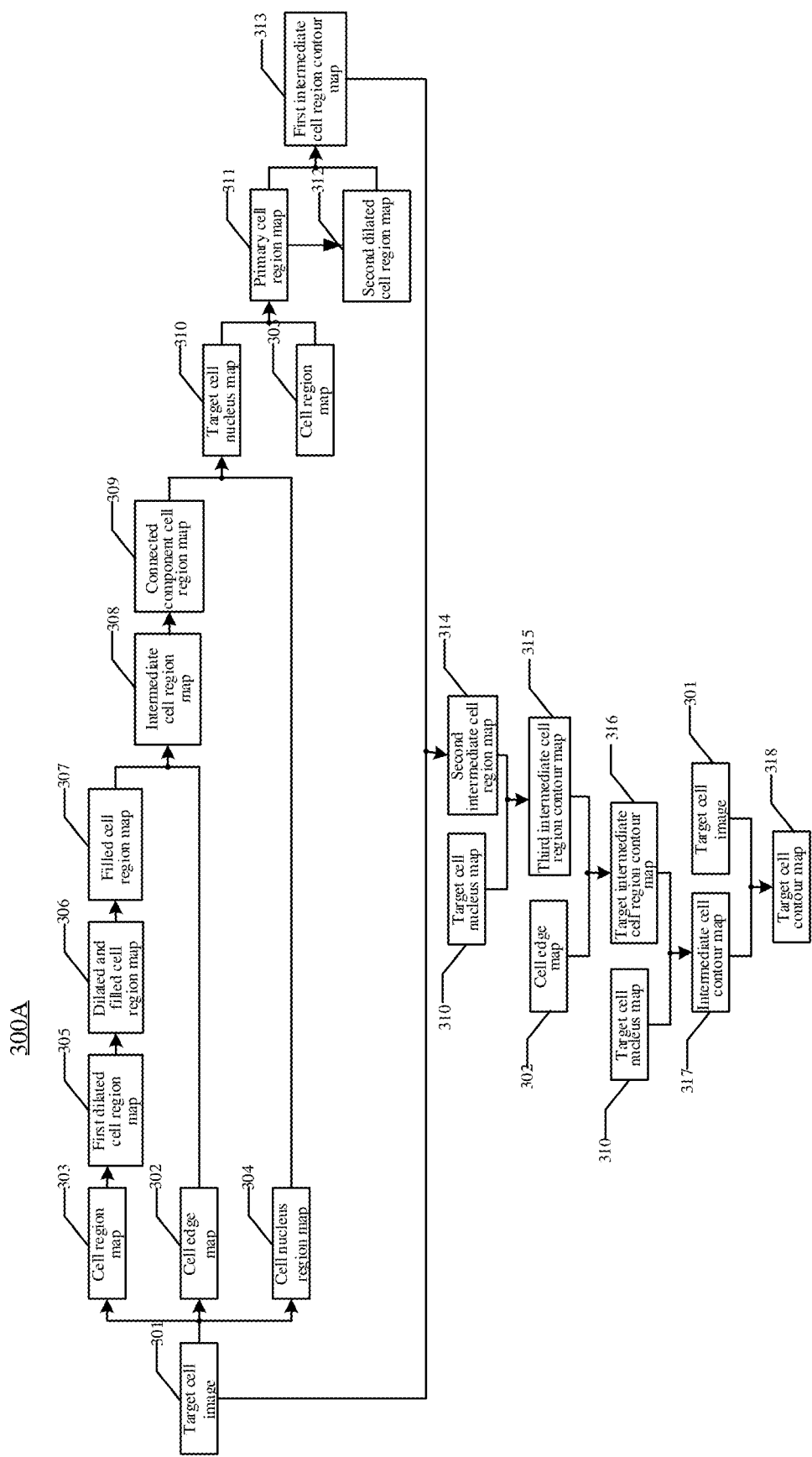
FIG. 3A schematically shows a schematic diagram of a process of processing a cell image according to the embodiments of the present disclosure.

FIG. 3A schematically shows a schematic diagram of a process of processing a cell image according to the embodiments of the present disclosure.

As shown in FIG. 3A, in 300A, an initial image segmentation result may be obtained according to a target cell image 301 based on a thresholding segmentation method. The initial image segmentation result may include a cell edge map 302, a cell region map 303, and a cell nucleus region map 304.

The cell region map 303 is processed by performing a dilation operation, so as to obtain a first dilated cell region map 305. The first dilated cell region map 305 is processed by performing a filling operation, so as to obtain a dilated and filled cell region map 306. The dilated and filled cell region map 306 is processed by performing an erosion operation, so as to obtain a filled cell region map 307. An intermediate cell region map 308 is obtained according to the filled cell region map 307 and the cell edge map 302.

At least one connected component cell region map 309 is obtained according to the intermediate cell region map 308 and a predetermined foreground region division strategy. A cell nucleus map corresponding to a connected component cell region map 309 in the at least one connected component cell region map 309 is obtained according to the cell nucleus region map 304 and the connected component cell region map 309 based on the morphological method. A target cell nucleus map 310 is obtained according to the cell region maps respectively corresponding to the at least one connected component cell region map 309.

A primary cell region map 311 may be obtained according to the target cell nucleus map 310 and the cell region map 303. The primary cell region map 311 is processed by performing a dilation operation, so as to obtain a second dilated cell region map 312. A first intermediate cell region contour map 313 is obtained according to the second dilated cell region map 312 and the primary cell region map 311. A second intermediate cell region contour map 314 is obtained according to the first intermediate cell region contour map 313 and the target cell image 301. A third intermediate cell region contour map 315 is obtained according to the second intermediate cell region contour map 314 and the target cell nucleus map 310. A target cell region contour map 316 is obtained according to the third intermediate cell region contour map 315 and the cell edge map 302.

A subtraction operation is performed on the target cell region contour map 316 and the target cell nucleus map 310 to obtain an intermediate cell contour map 317. A watershed processing is performed on the intermediate cell contour map 317 based on the target cell image 301, so as to obtain a target cell contour map 318.

A process of obtaining the cell nucleus map corresponding to the connected component cell region map 309 according to the cell nucleus region map 304 and the connected component cell region map 309 based on the morphological method in FIG. 3A will be further described below with reference to FIG. 3B.

Figure 3B:
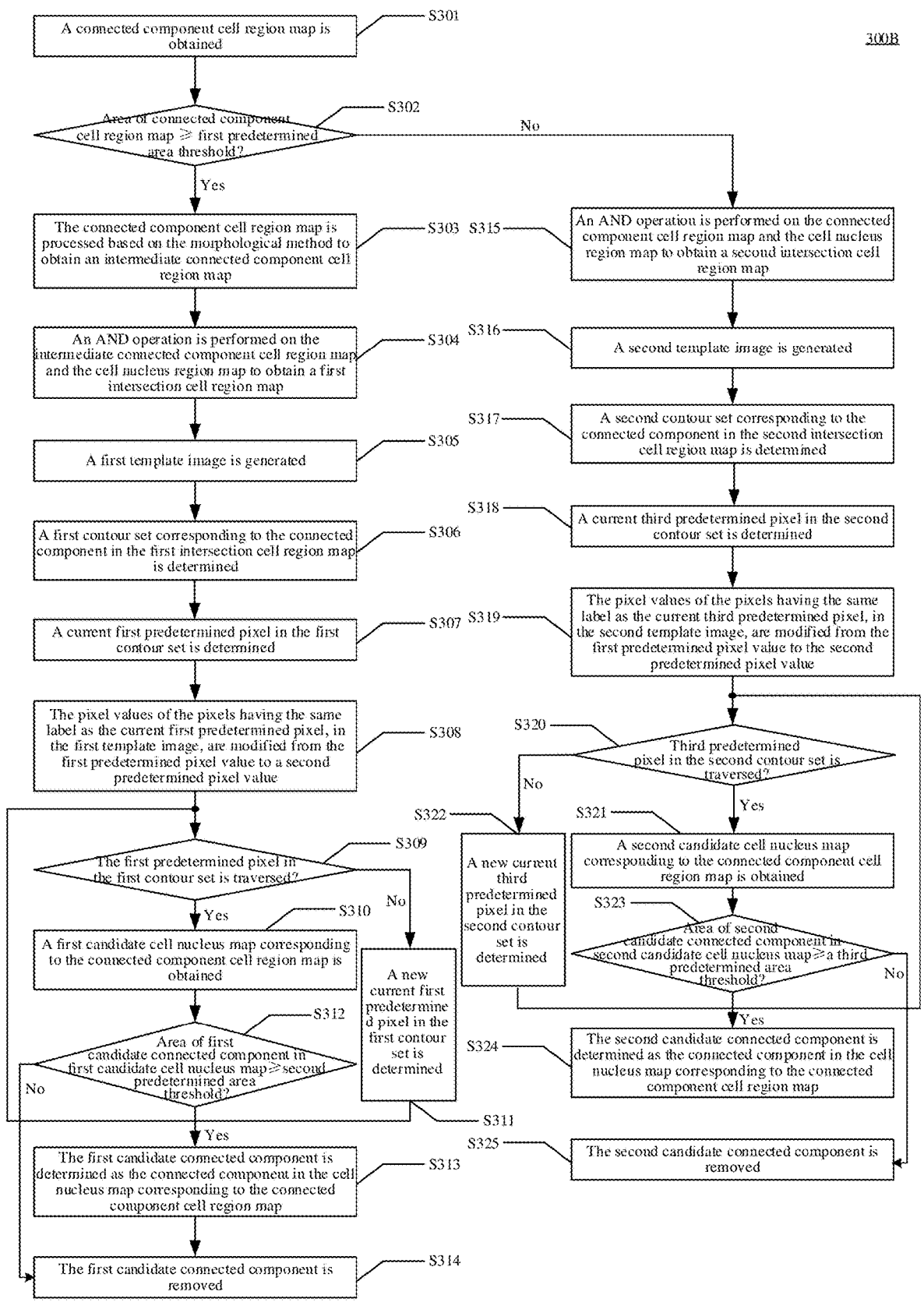
FIG. 3B schematically shows a flowchart of obtaining a cell nucleus map corresponding to a connected component cell region map according to a cell nucleus region map and the connected component cell region map based on a morphological method according to the embodiments of the present disclosure.

FIG. 3B schematically shows a flowchart of obtaining the cell nucleus map corresponding to the connected component cell region map according to the cell nucleus region map and the connected component cell region map based on a morphological method according to the embodiments of the present disclosure.

As shown in FIG. 3B, a method 300B includes operation S301 to operation S325.

In operation S301, a connected component cell region map is obtained.

In operation S302, it is determined whether an area of the connected component cell region map is greater than or equal to the first predetermined area threshold, and if yes, the process proceeds to perform operation S302 to operation S314; or if not, the process proceeds to perform operation S315 to operation S325.

In operation S303, the connected component cell region map is processed based on the morphological method to obtain an intermediate connected component cell region map.

In operation S304, an AND operation is performed on the intermediate connected component cell region map and the cell nucleus region map to obtain a first intersection cell region map.

In operation S305, a first template image is generated, where a size of the first template image is equal to the size of the intermediate connected component cell region map, and a pixel value of a pixel of the first template image is the first predetermined pixel value.

In operation S306, a first contour set corresponding to the connected components in the first intersection cell region map is determined.

In operation S307, a current first predetermined pixel in the first contour set is determined.

In operation S308, the pixel values of the pixels, which have the same label as the current first predetermined pixel, in the first template image, are changed from the first predetermined pixel value to a second predetermined pixel value.

In operation S309, it is determined whether the first predetermined pixels in the first contour set are traversed, and if yes, the process proceeds to perform operation S310 and operation S312 to operation S314; or if not, the process proceeds to perform operation S311.

In operation S310, a first candidate cell nucleus map corresponding to the connected component cell region map is obtained.

In operation S311, a new current first predetermined pixel in the first contour set is determined, and the process returns to perform operation S309.

In operation S312, it is determined whether an area of a first candidate connected component in the first candidate cell nucleus map is greater than or equal to a second predetermined area threshold, and if yes, the process proceeds to perform operation S313; or if not, the process proceeds to perform operation S314.

In operation S313, the first candidate connected component is determined as the connected component in the cell nucleus map corresponding to the connected component cell region map.

In operation S314, the first candidate connected component is removed.

In operation S315, an AND operation is performed on the connected component cell region map and the cell nucleus region map to obtain a second intersection cell region map.

In operation S316, a second template image is generated, where a size of the second template image is equal to the size of the connected component cell region map, and a pixel value of a pixel of the second template image is the first predetermined pixel value.

In operation S317, a second contour set corresponding to the connected components in the second intersection cell region map is determined.

In operation S318, a current third predetermined pixel in the second contour set is determined.

In operation S319, the pixel values of the pixels, which have the same label as the current third predetermined pixel, in the second template image, are changed from the first predetermined pixel value to the second predetermined pixel value.

In operation S320, it is determined whether the third predetermined pixels in the second contour set are traversed, and if yes, the process proceeds to perform operation S321 and operation S323 to operation S325; or if not, the process proceeds to perform operation S322.

In operation S321, a second candidate cell nucleus map corresponding to the connected component cell region map is obtained.

In operation S322, a new current third predetermined pixel in the second contour set is determined.

In operation S323, it is determined whether an area of a second candidate connected component in the second candidate cell nucleus map is greater than or equal to a third predetermined area threshold, and if yes, the process proceeds to perform operation S324; or if not, the process proceeds to perform operation S325.

In operation S324, the second candidate connected component is determined as the connected component in the cell nucleus map corresponding to the connected component cell region map.

In operation S325, the second candidate connected component is removed.

Taking stem cells as an example, the method for processing the cell image according to the present disclosure will be further described in combination with specific embodiments with reference to FIG. 4A to FIG. 4K.

Figure 4A:
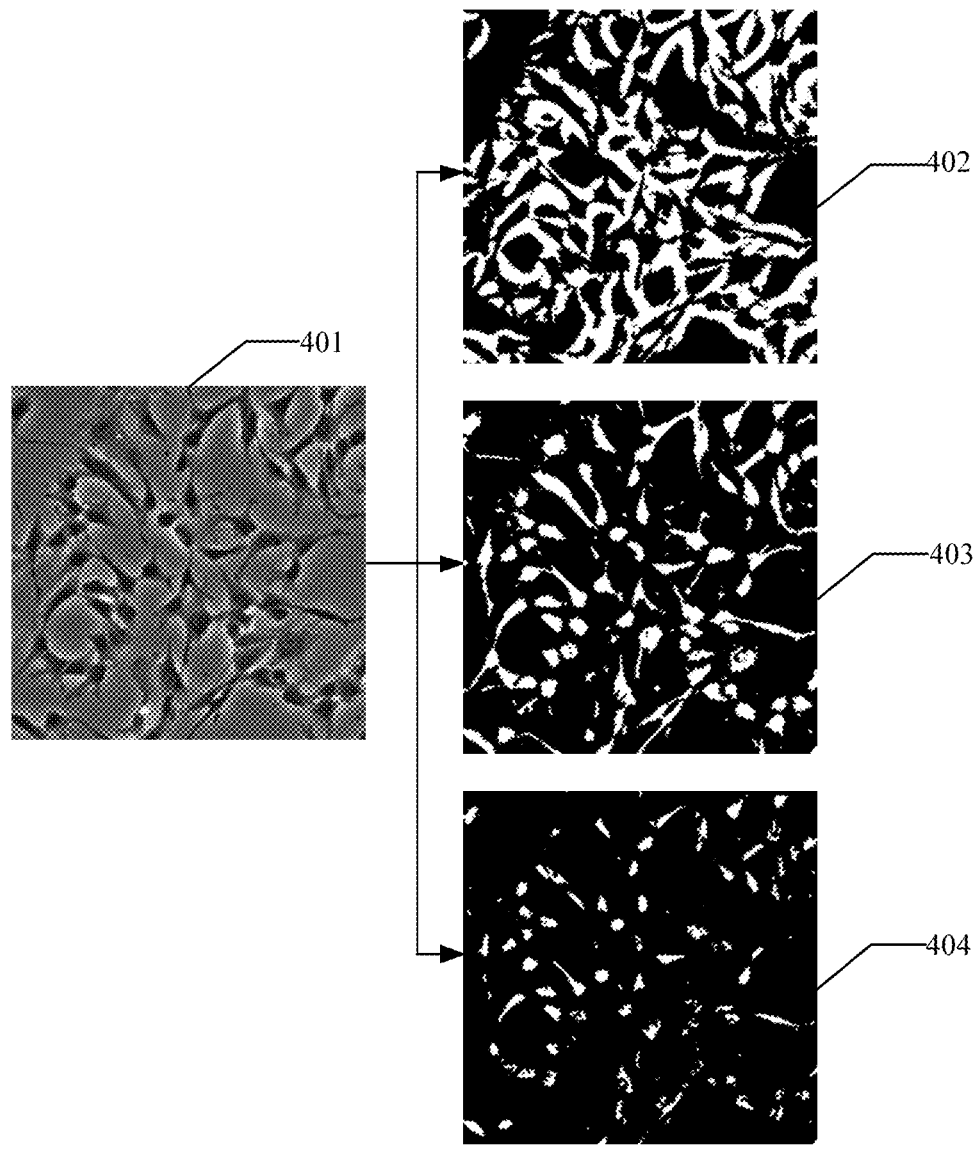
FIG. 4A schematically shows a schematic diagram of an example of an initial image segmentation result according to the embodiments of the present disclosure.

FIG. 4A schematically shows a schematic diagram of an example of an initial image segmentation result according to the embodiments of the present disclosure.

As shown in FIG. 4A, in 400A, a target cell image 401 may be processed by using a thresholding segmentation method, so as to obtain an initial image segmentation result. The initial image segmentation result may include a cell edge map 402, a cell region map 403, and a cell nucleus region map 404.

Figure 4B:
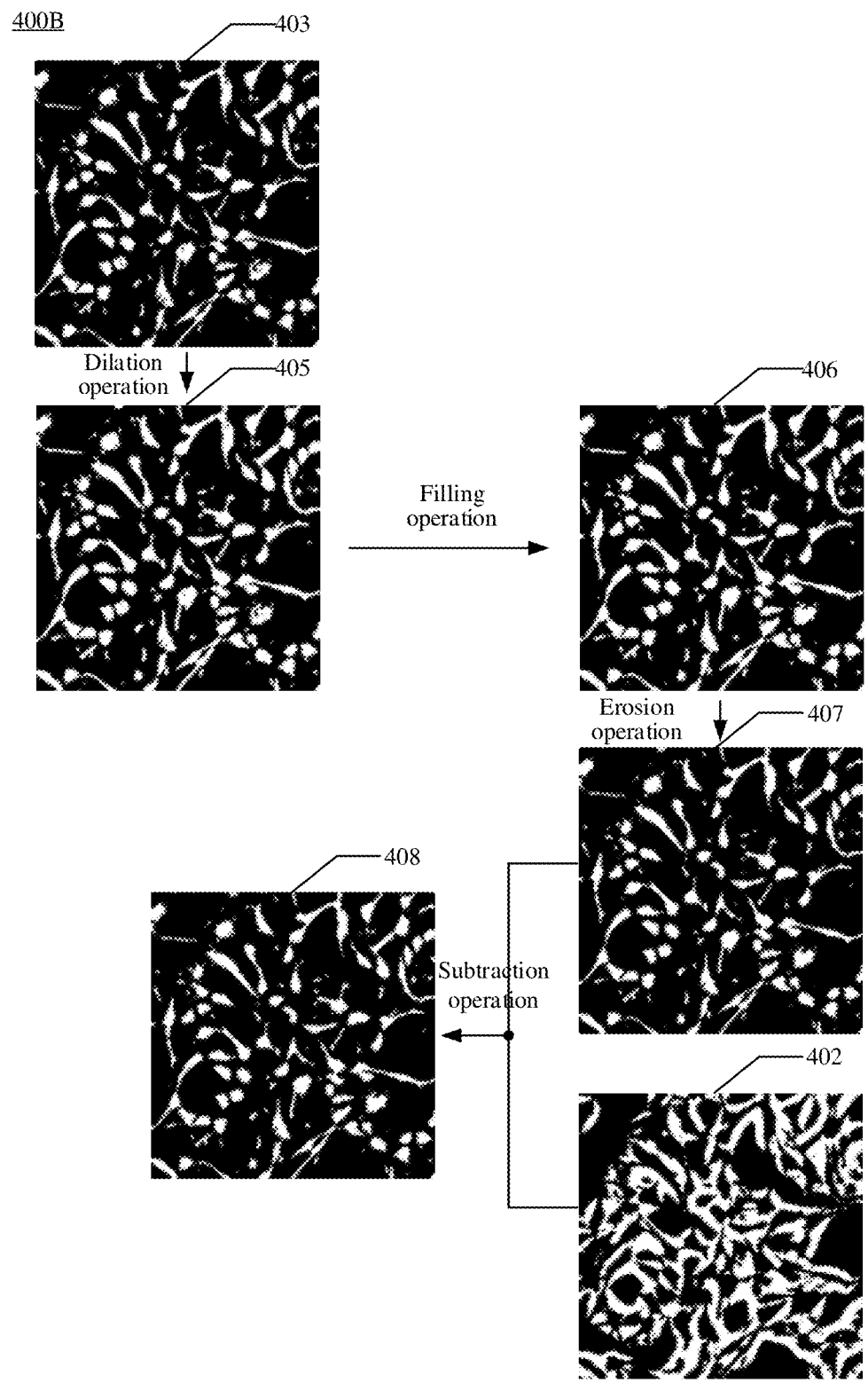
FIG. 4B schematically shows a schematic diagram of an example of obtaining an intermediate cell region map according to the embodiments of the present disclosure.

FIG. 4B schematically shows a schematic diagram of an example of obtaining an intermediate cell region map according to the embodiments of the present disclosure.

As shown in FIG. 4B, in 400B, the cell region map 403 is processed by performing a dilation operation, so as to obtain a first dilated cell region map 405. The first dilated cell region map 405 is processed by performing a filling operation, so as to obtain a dilated and filled cell region map 406. The dilated and filled cell region map 406 is processed by performing an erosion operation, so as to obtain a filled cell region map 407. A subtraction operation is performed on the filled cell region map 407 and the cell edge map 402 to obtain an intermediate cell region map 408.

Figure 4C:
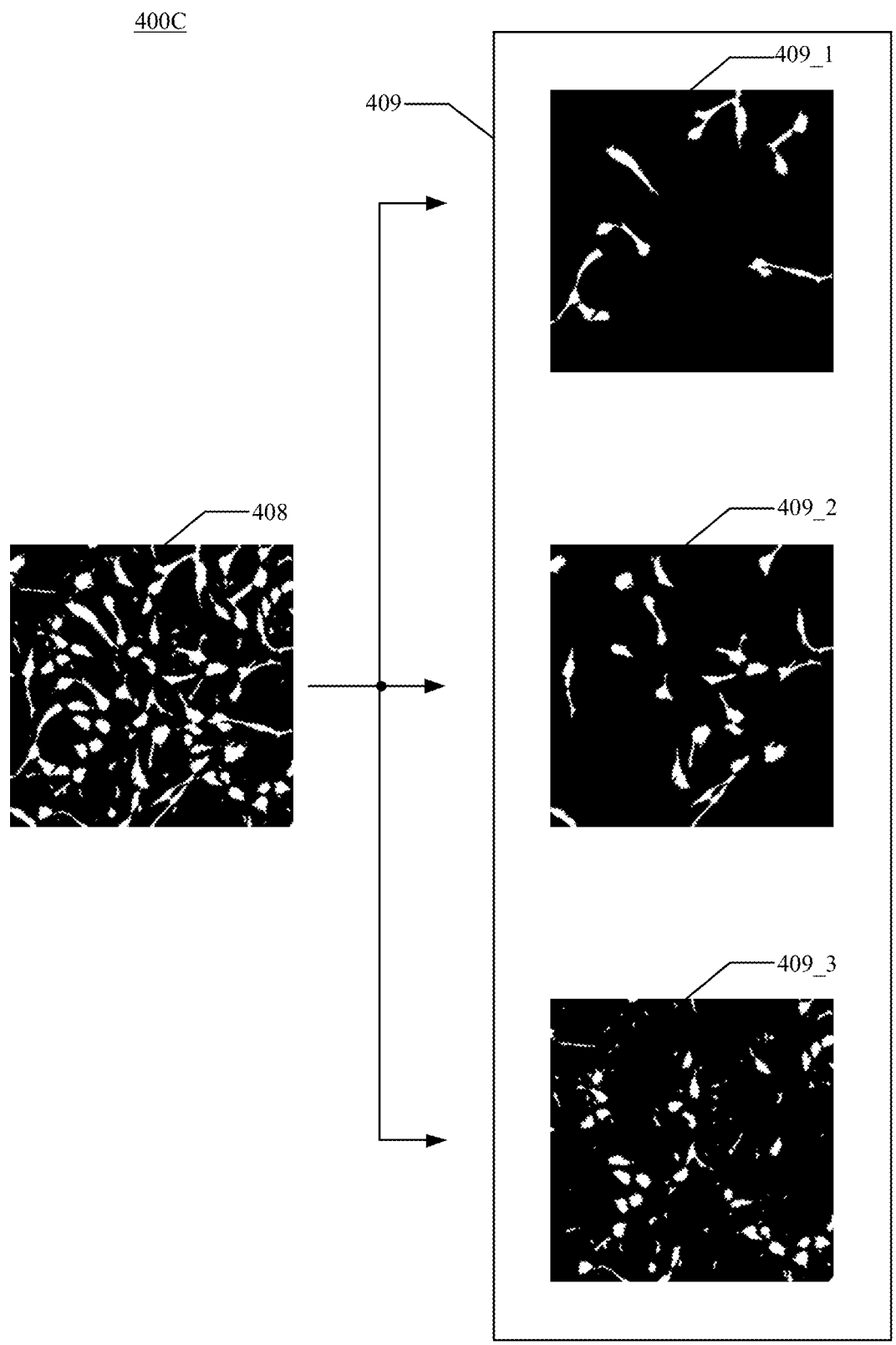
FIG. 4C schematically shows a schematic diagram of an example of obtaining a connected component cell region map according to the embodiments of the present disclosure.

FIG. 4C schematically shows a schematic diagram of an example of obtaining a connected component cell region map according to the embodiments of the present disclosure.

As shown in FIG. 4C, in 400C, the intermediate cell region map 408 may be divided according to the predetermined foreground region division strategy, so as to obtain a set of connected component cell region maps 409. The set of connected component cell region maps 409 may include a connected component cell region map 409_1, a connected component cell region map 409_2, and a connected component cell region map 409_3. An area of a connected component in the connected component cell region map 409_1 is in a first predetermined area range. An area of a connected component in the connected component cell region map 409_2 is in a second predetermined area range. An area of a connected component in the connected component cell region map 409_3 is in a third predetermined area range. For example, the first predetermined area range may be greater than or equal to 600 $\mu m^2$, the second predetermined area range may be greater than 200 $\mu m^2$ and less than 600 $\mu m^2$, and the third predetermined area range may be less than or equal to 200 $\mu m^2$.

Figure 4D:
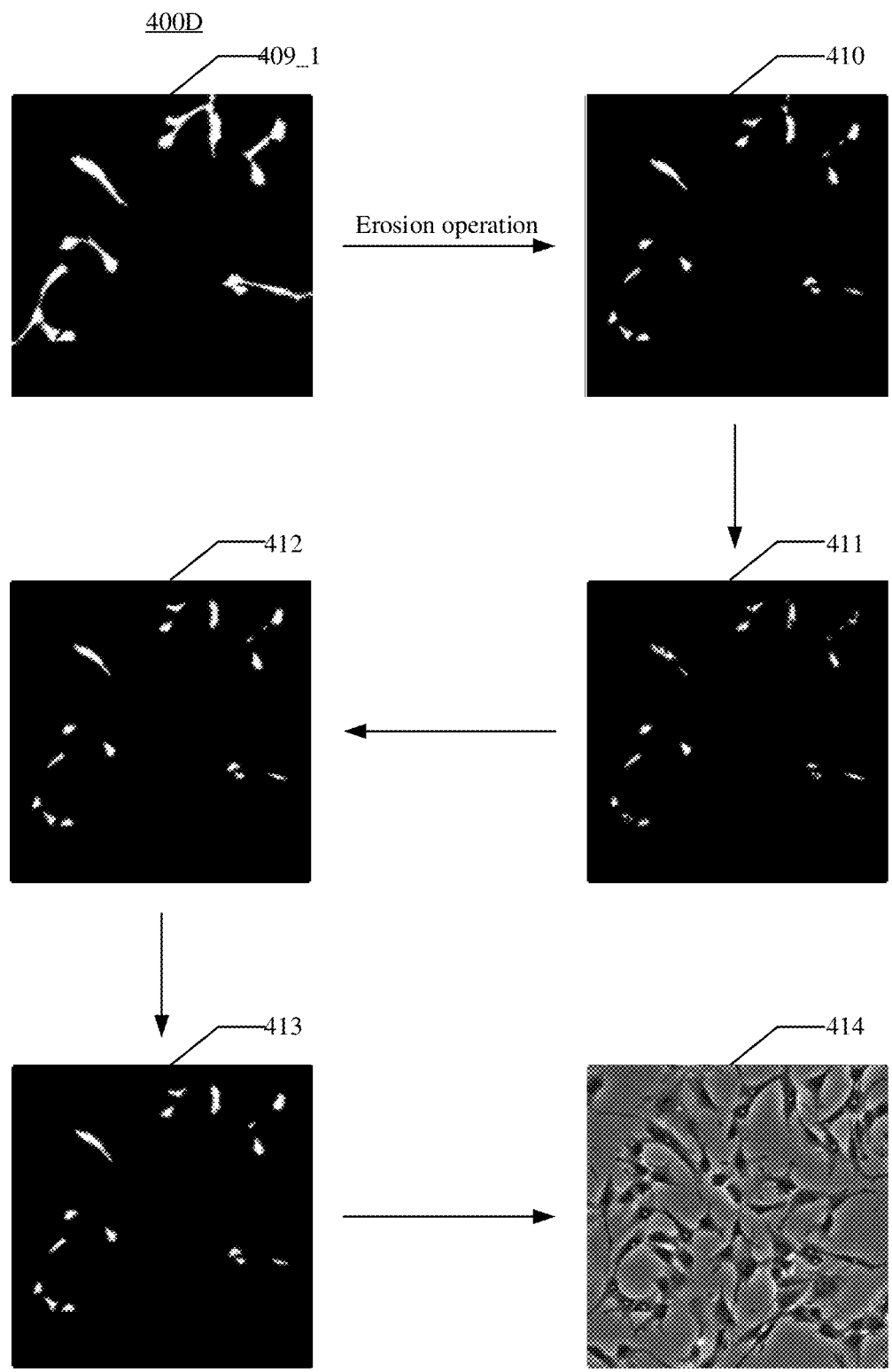
FIG. 4D schematically shows a schematic diagram of an example of obtaining a cell nucleus map corresponding to a connected component cell region map according to the embodiments of the present disclosure.

FIG. 4D schematically shows a schematic diagram of an example of obtaining a cell nucleus map corresponding to the connected component cell region map according to the embodiments of the present disclosure.

As shown in FIG. 4D, in 400D, the connected component cell region map 409_1 may be processed by performing an erosion operation, so as to obtain an intermediate connected component cell region map 410. An AND operation is performed on the intermediate connected component cell region map 410 and the cell nucleus region map to obtain a first intersection cell region map 411. The connected component in the intermediate connected component cell region map 410 that is located in the first intersection cell region map 411 is retained and other regions are removed according to the first intersection cell region map 411 and the intermediate connected component cell region map 410, so as to obtain a first candidate cell nucleus map 412 corresponding to the connected component cell region map. A first target connected component may be removed from the first candidate cell nucleus map 412 to obtain a first candidate cell nucleus map in which the first target connected component is removed. The first candidate cell nucleus map in which the first target connected component is removed is determined as a cell nucleus map 413 corresponding to the connected component cell region map 409_1. The first target connected component may refer to a connected component of which the area is less than the second predetermined area threshold. A center point of each connected component in the cell nucleus map 413 is drawn in the target cell image to obtain a target cell image 414.

Figure 4E:
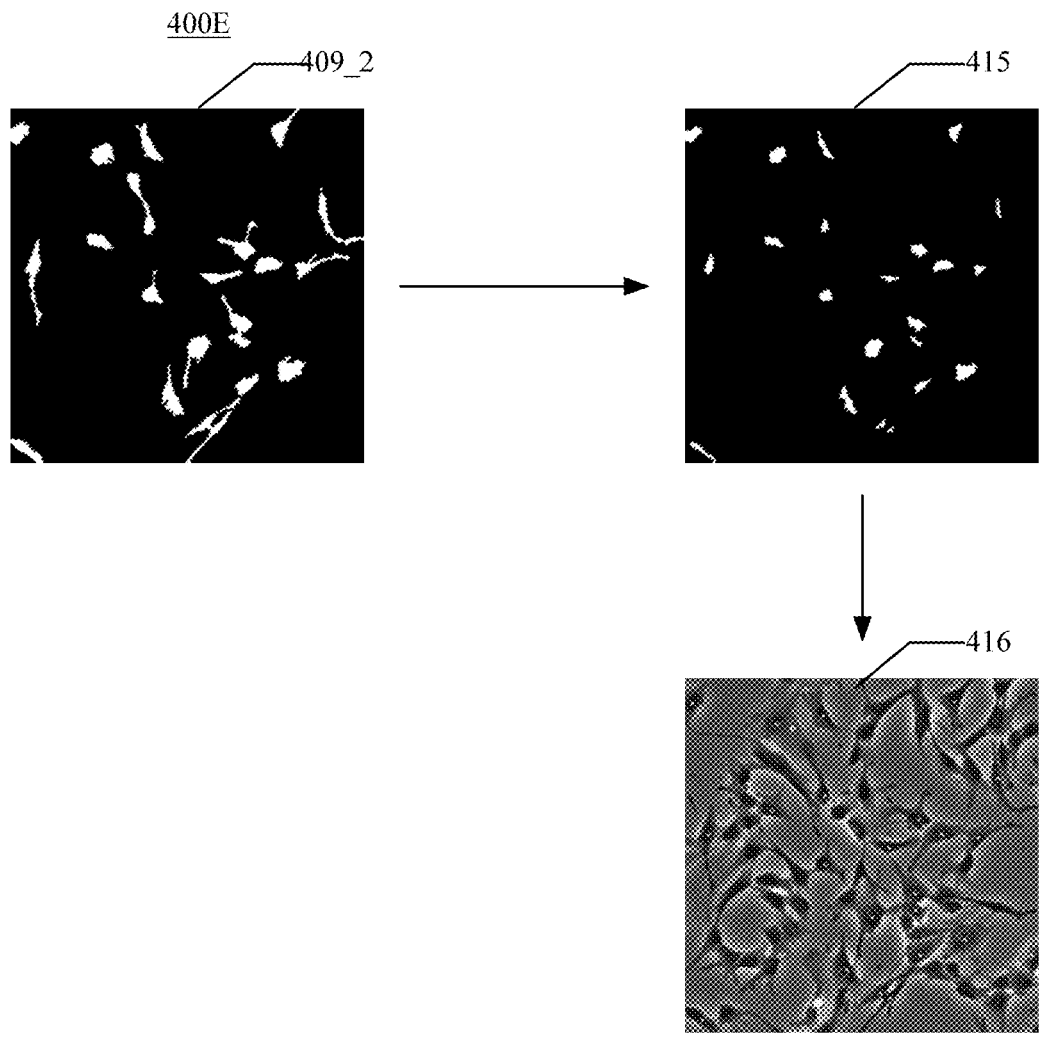
FIG. 4E schematically shows a schematic diagram of an example of a cell nucleus map corresponding to a connected component cell region map according to another embodiments of the present disclosure.

FIG. 4E schematically shows a schematic diagram of an example of a cell nucleus map corresponding to the connected component cell region map according to another embodiment of the present disclosure.

As shown in FIG. 4E, in 400E, a cell nucleus map 415 corresponding to the connected component cell region map 409_2 may be obtained using a similar method for obtaining the cell nucleus map 413 corresponding to the connected component cell region map 409_1. A center point of each connected component in the cell nucleus map 415 is drawn in the target cell image 401 to obtain a target cell image 416.

Figure 4F:
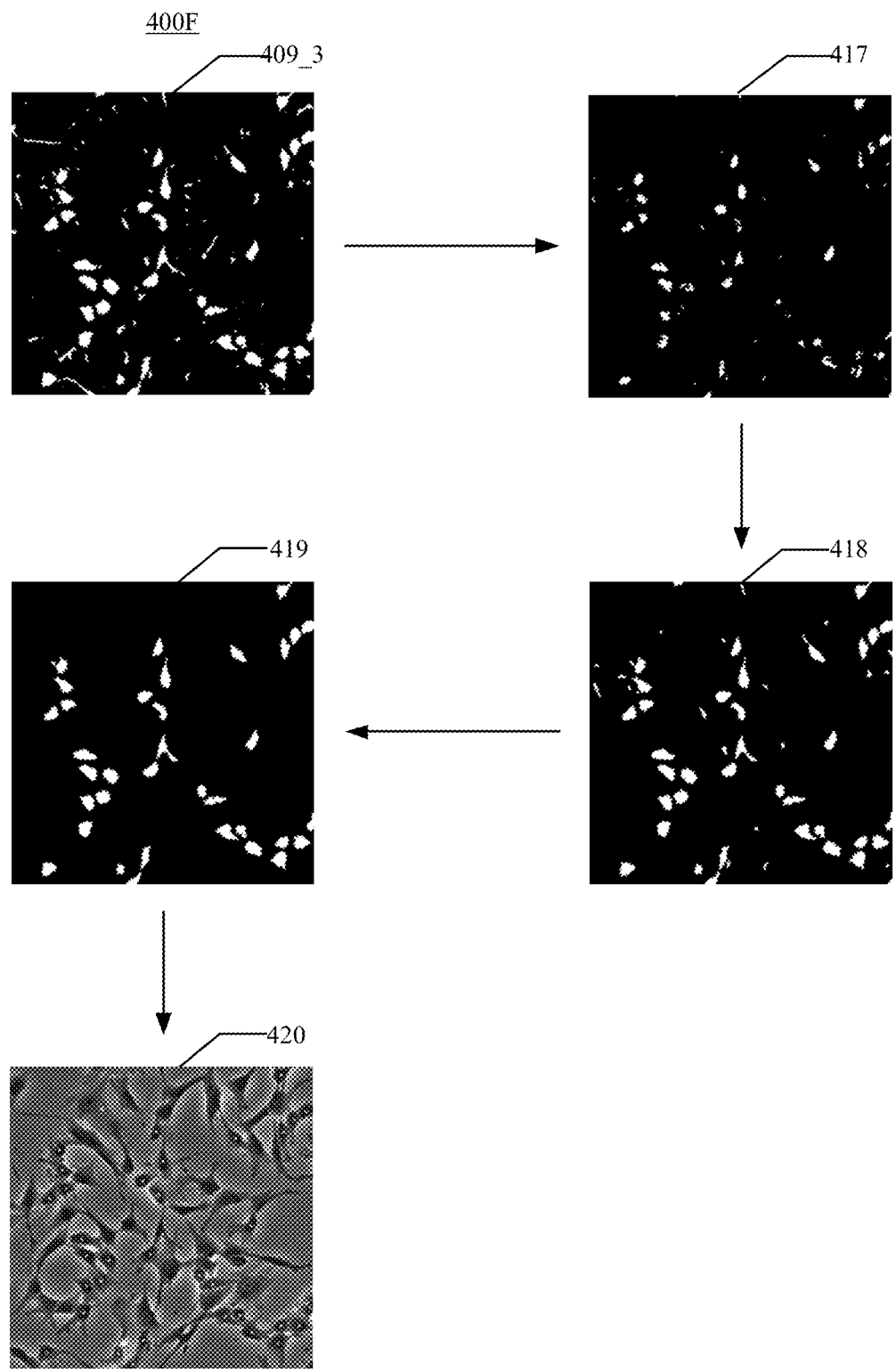
FIG. 4F schematically shows a schematic diagram of an example of obtaining a cell nucleus map corresponding to a connected component cell region map according to yet another embodiments of the present disclosure.

FIG. 4F schematically shows a schematic diagram of an example of obtaining a cell nucleus map corresponding to the connected component cell region map according to another embodiment of the present disclosure.

As shown in FIG. 4F, in 400F, an AND operation is performed on the connected component cell region map 409_3 and the cell nucleus region map to obtain a second intersection cell region map 417. The connected component in the connected component cell region map 409_3 that is located in the second intersection cell region map 414 is retained and other regions are removed according to the second intersection cell region map 417 and the connected component cell region map 409_3, so as to obtain a first candidate cell nucleus map 418 corresponding to the connected component cell region map. A second target connected component may be removed from the first candidate cell nucleus map 418 to obtain a first candidate cell nucleus map in which the second target connected component is removed. The first candidate cell nucleus map in which the second target connected component is removed is determined as a cell nucleus map 419 corresponding to the connected component cell region map 409_3. The second target connected component may refer to a connected component of which the area is less than the third predetermined area threshold. A center point of each connected component in the cell nucleus map 419 is drawn in the target cell image to obtain a target cell image 420.

Figure 4G:
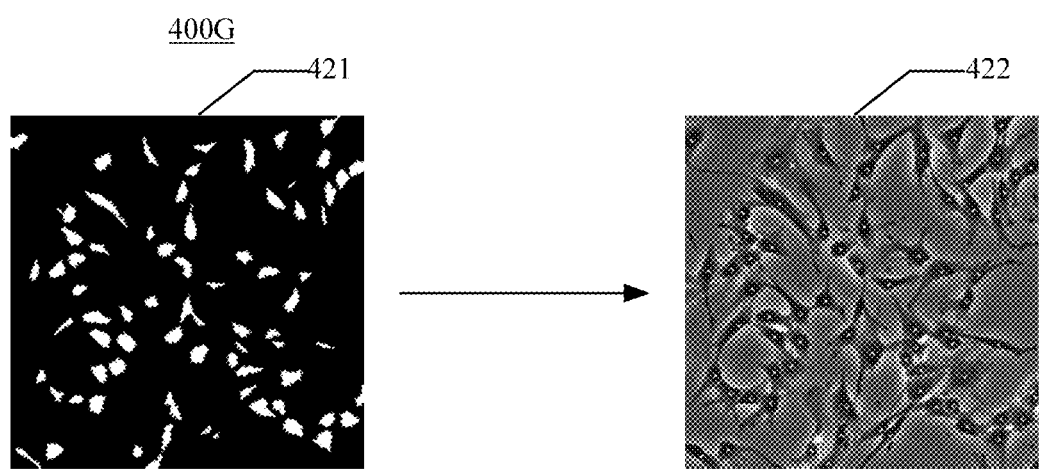
FIG. 4G schematically shows a schematic diagram of an example of obtaining a target cell nucleus map according to the embodiments of the present disclosure.

FIG. 4G schematically shows a schematic diagram of an example of obtaining a target cell nucleus map according to the embodiments of the present disclosure.

As shown in FIG. 4G, in 400G, the cell nucleus map, the cell nucleus map and the cell nucleus map may be merged to obtain a target cell nucleus map 421. In addition, a center point of each connected component in the target cell nucleus map 421 may be drawn in the target cell image 401 to obtain a cell nucleus count map 422.

Figure 4H:
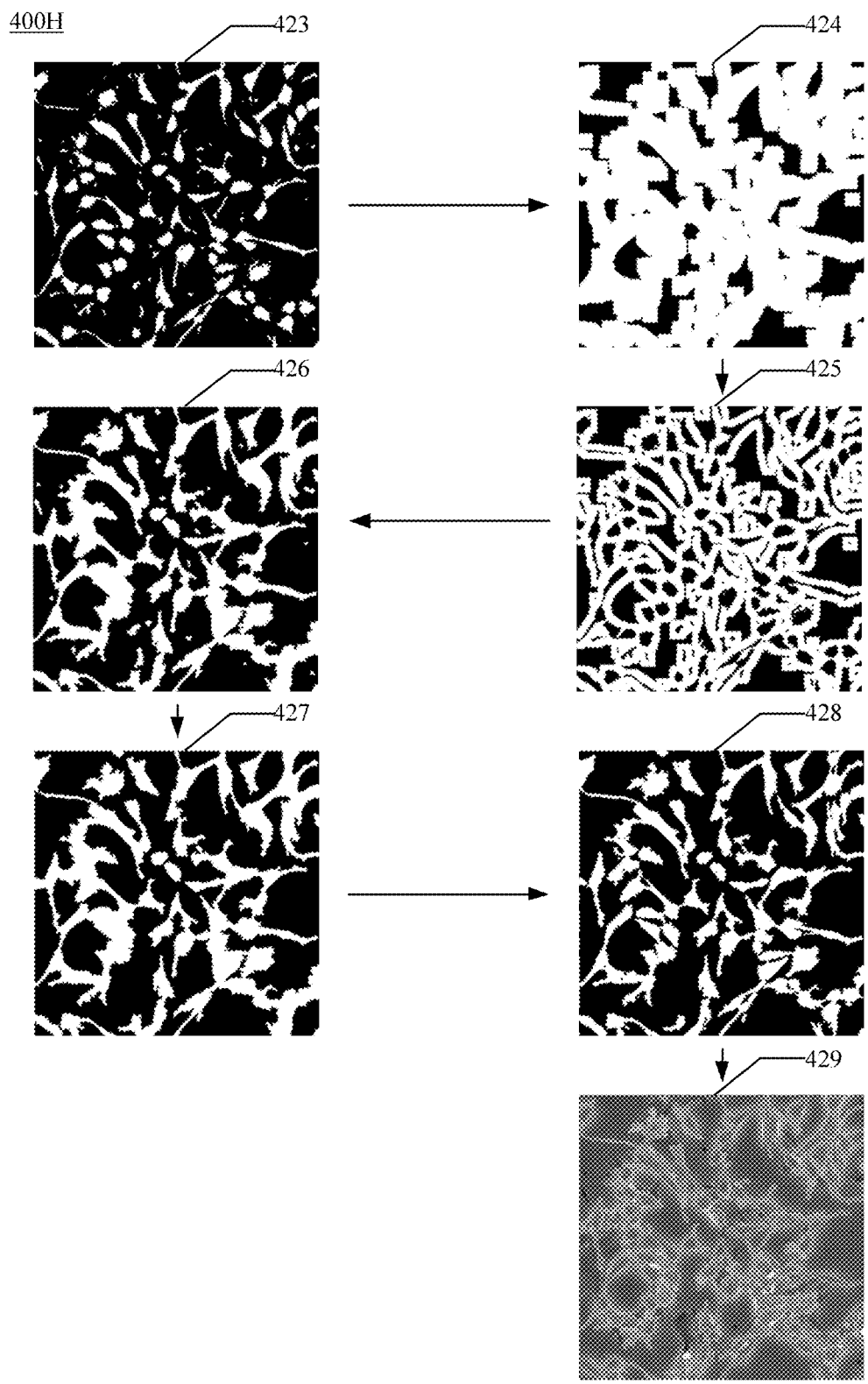
FIG. 4H schematically shows a schematic diagram of an example of obtaining a target cell region contour map according to the embodiments of the present disclosure.

FIG. 4H schematically shows a schematic diagram of an example of obtaining a target cell region contour map according to the embodiments of the present disclosure.

As shown in FIG. 4H, in 400H, a primary cell region map 423 may be obtained according to the target cell nucleus map and the cell region map. The primary cell region map 423 may be processed by performing a dilation operation, so as to obtain a second dilated cell region map 424. A first intermediate cell region contour map 425 may be obtained according to the second dilated cell region map 424 and the primary cell region map 423.

A watershed processing may be performed on the first intermediate cell region contour map 425 based on the target cell image, so as to obtain a fourth intermediate cell region contour map. A pixel value of a pixel of a background region in the fourth intermediate cell region contour map is set to the first predetermined pixel value, and a pixel value of a pixel in other regions other than the background region in the fourth intermediate cell region contour map is set to the second predetermined pixel value, so as to obtain a second intermediate cell region contour map 426.

An AND operation may be performed on the second intermediate cell region contour map 426 and the target cell nucleus map, so as to obtain an intersection region between the second intermediate cell region contour map and the target cell nucleus map. The connected component of the second intermediate cell region located in the intersection region contour map may be retained, and other regions other than the intersection region may be removed, so as to obtain a third intermediate cell region contour map 427.

The cell edge map may be subtracted from the third intermediate cell region contour map 427 to obtain a target cell region contour map 428. In addition, a center point of each connected component in the target cell region contour map 428 is drawn in the target cell image 401 to obtain a target cell image 429.

Figure 4I:
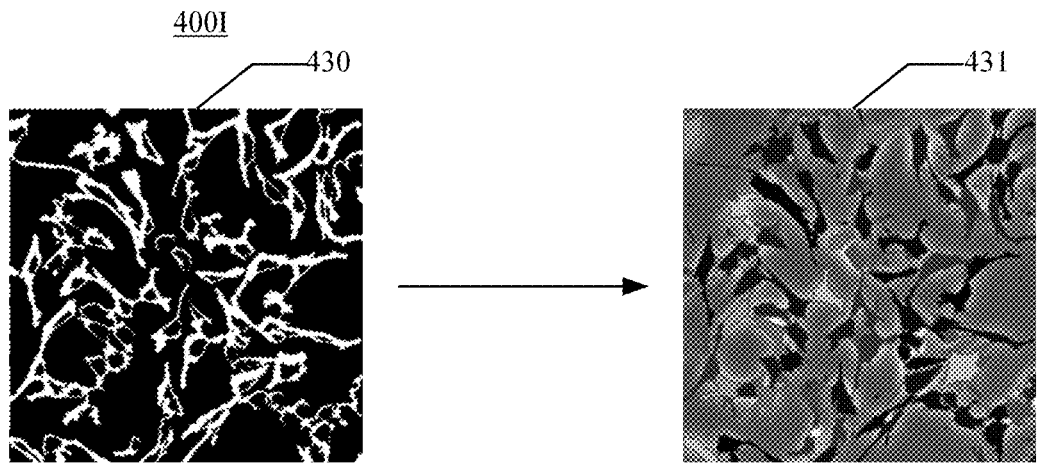
FIG. 4I schematically shows a schematic diagram of an example of obtaining a target cell contour map according to the embodiments of the present disclosure.

FIG. 4I schematically shows a schematic diagram of an example of obtaining a target cell contour map according to the embodiments of the present disclosure.

As shown in FIG. 4I, in 400I, a subtraction operation is performed on the target cell region contour map and the target cell nucleus map to obtain an intermediate cell contour map 430. A watershed processing is performed on the intermediate cell contour map 430 based on the target cell image, so as to obtain a target cell contour map. In addition, different cells may be colored in the target cell image to obtain a target cell image 431.

Figure 4J:
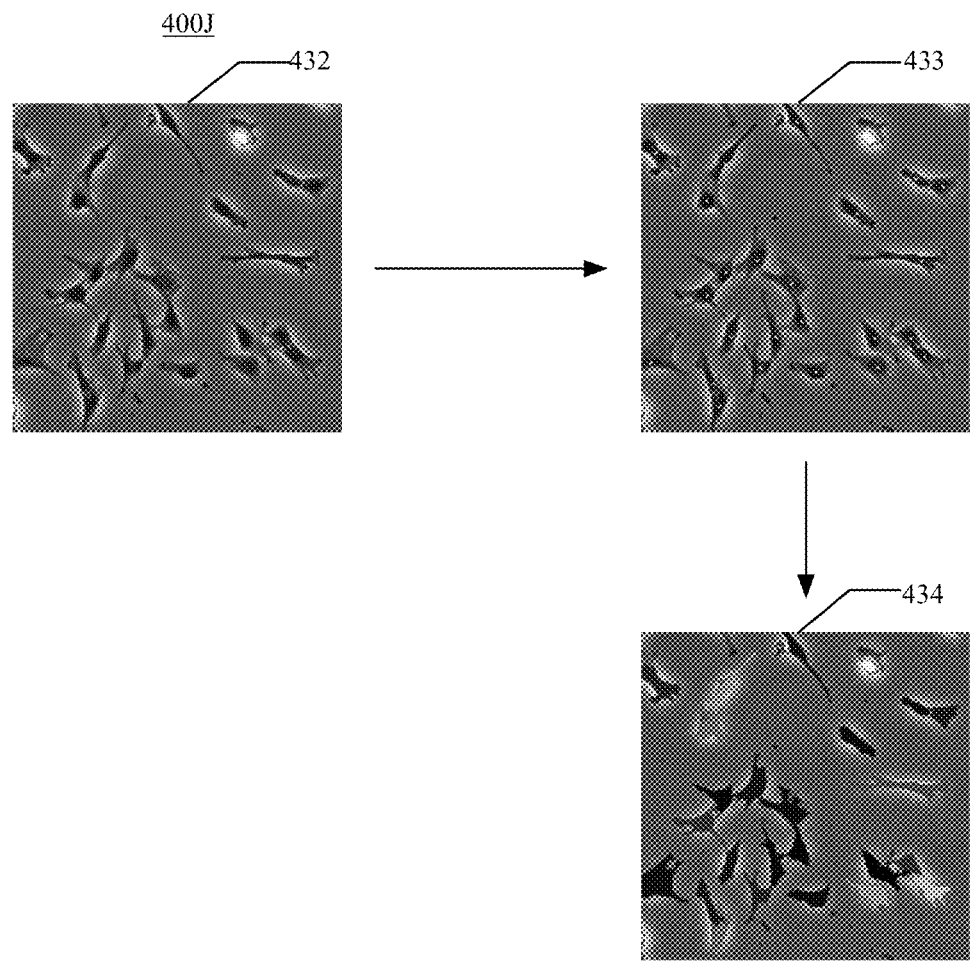
FIG. 4J schematically shows a schematic diagram of an example of a target image segmentation result in an early stage of a cell culture according to the embodiments of the present disclosure.

FIG. 4J schematically shows a schematic diagram of an example of a target image segmentation result in an early stage of a cell culture according to the embodiments of the present disclosure.

As shown in FIG. 4J, in 400J, a target cell image 432 is processed using the method for processing the cell image described in the embodiments of the present disclosure, so as to obtain a target cell nucleus map 433 and a target cell contour map 434. A target image segmentation result is obtained according to the target cell nucleus map 433 and the target cell contour map 434.

Figure 4K:
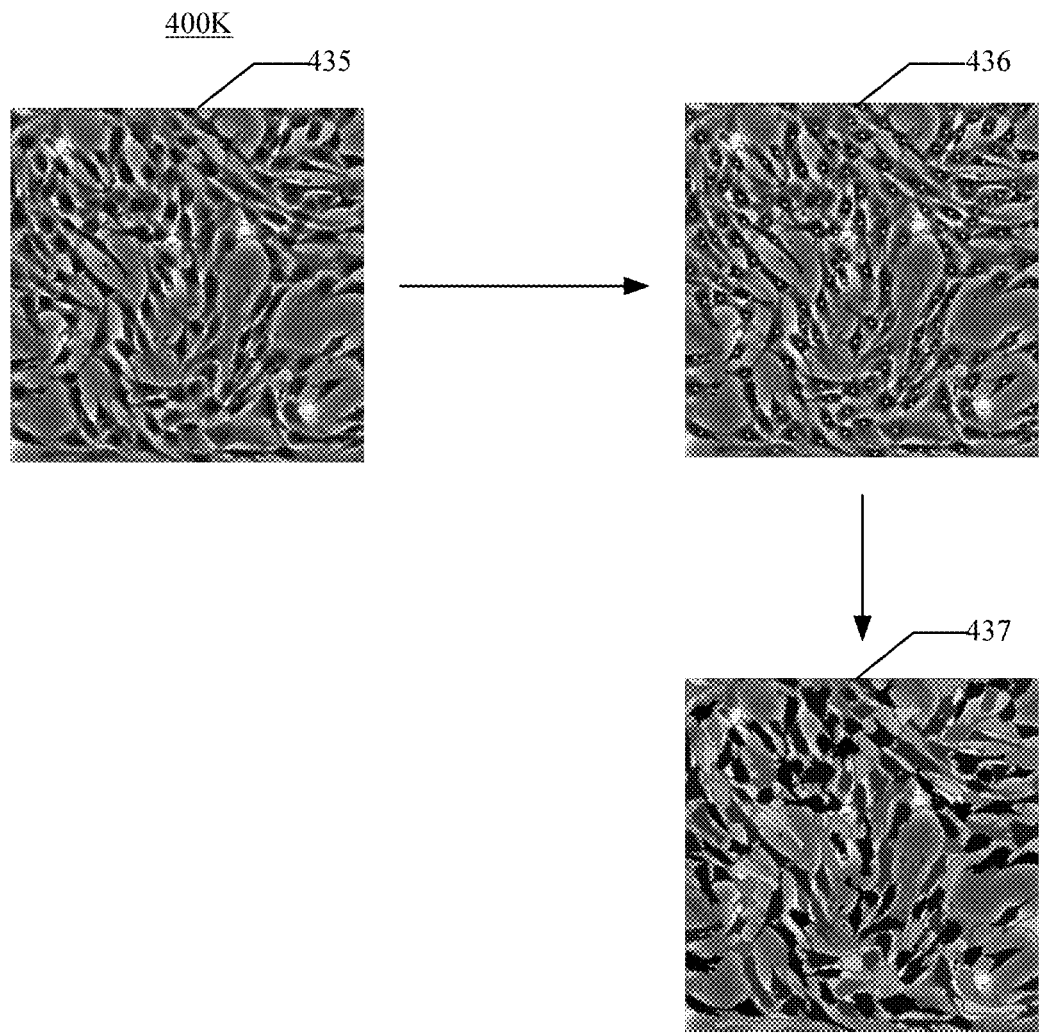
FIG. 4K schematically shows a schematic diagram of an example of a target image segmentation result in a later stage of a cell culture according to the embodiments of the present disclosure.

FIG. 4K schematically shows a schematic diagram of an example of the target image segmentation result in a later stage of a cell culture according to the embodiments of the present disclosure.

As shown in FIG. 4K, in 400K, a target cell image 435 is processed using the method for processing the cell image described in the embodiments of the present disclosure, so as to obtain a target cell nucleus map 436 and a target cell contour map 437. A target image segmentation result is obtained according to the target cell nucleus map 436 and the target cell contour map 437.

Figure 5:
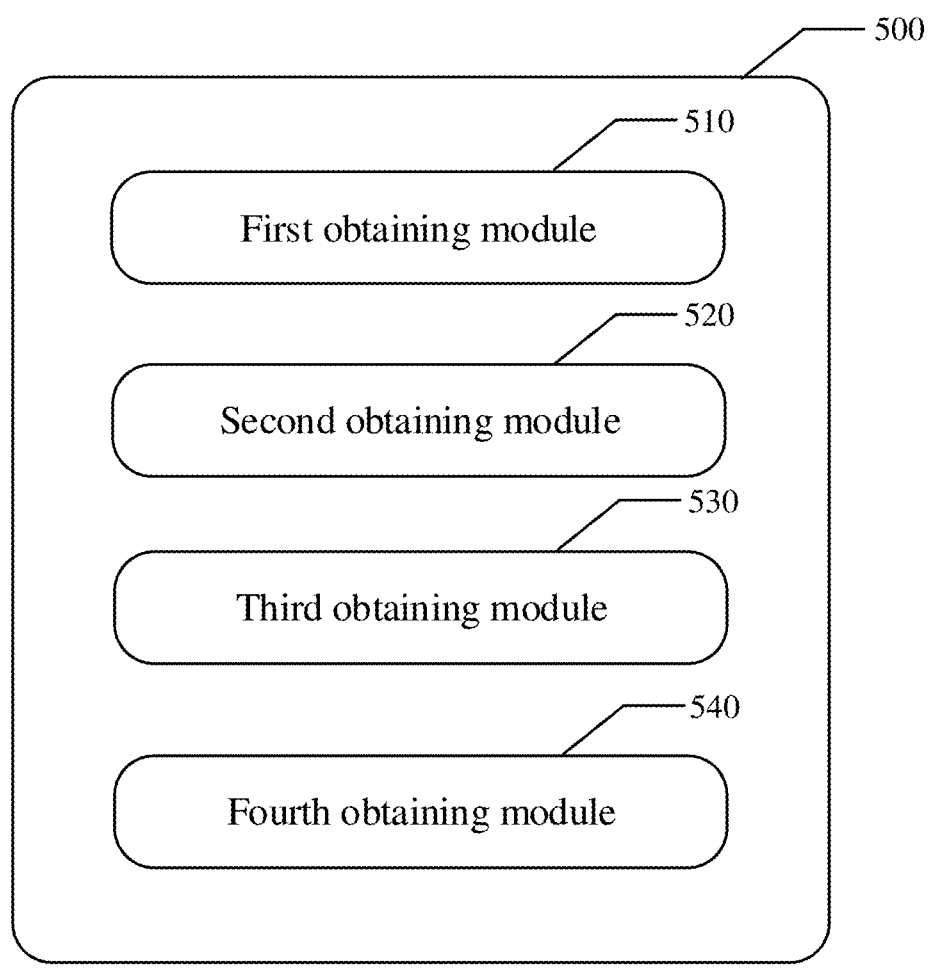
FIG. 5 schematically shows a block diagram of an apparatus for processing a cell image according to the embodiments of the present disclosure.

FIG. 5 schematically shows a block diagram of an apparatus for processing a cell image according to the embodiments of the present disclosure.

As shown in FIG. 5, the apparatus for processing the cell image may include a first obtaining module 510, a second obtaining module 520, a third obtaining module 530, and a fourth obtaining module 540.

The first obtaining module 510 is used to obtain a target cell nucleus map according to an initial image segmentation result of a target cell image based on a morphological method. The target cell image is an image corresponding to at least one cell.

The second obtaining module 520 is used to obtain a target cell region contour map according to the target cell nucleus map and the initial image segmentation result based on the morphological method.

The third obtaining module 530 is used to obtain a target cell contour map according to the target cell region contour map and the target cell nucleus map based on the morphological method.

The fourth obtaining module 540 is used to obtain a target image segmentation result according to the target cell contour map and the target cell nucleus map.

According to the embodiments of the present disclosure, the apparatus 500 for processing the cell image may further include a fifth obtaining module.

The fifth obtaining module is used to obtain the initial image segmentation result according to the target cell image based on a thresholding segmentation method.

According to the embodiments of the present disclosure, the thresholding segmentation method includes a maximum between-cluster variance method.

According to the embodiments of the present disclosure, the fifth obtaining module may include a first obtaining sub-module, a second obtaining sub-module, a third obtaining sub-module, and a fourth obtaining sub-module.

The first obtaining sub-module is used to obtain a first gray scale threshold, a second gray scale threshold and a third gray scale threshold according to the target cell image based on the maximum between-cluster variance method. The second gray scale threshold is greater than the third gray scale threshold and less than the first gray scale threshold.

The second obtaining sub-module is used to perform a binarization operation on the target cell image according to the first gray scale threshold, so as to obtain a cell edge map.

The third obtaining sub-module is used to perform a binarization operation on the target cell image according to the second gray scale threshold, so as to obtain a cell region map.

The fourth obtaining sub-module is used to perform a binarization operation on the target cell image according to the third gray scale threshold, so as to obtain a cell nucleus region map.

According to the embodiments of the present disclosure, the initial image segmentation result includes the cell edge map, the cell region map, and the cell nucleus region map.

According to the embodiments of the present disclosure, the first obtaining module 510 may include a fifth obtaining sub-module, a sixth obtaining sub-module, and a seventh obtaining sub-module.

The fifth obtaining sub-module is used to obtain an intermediate cell region map according to the cell region map and the cell edge map based on the morphological method.

The sixth obtaining sub-module is used to obtain at least one connected component cell region map according to the intermediate cell region map and a predetermined foreground region division strategy.

The seventh obtaining sub-module is used to obtain the target cell nucleus map according to the cell nucleus region map and the at least one connected component cell region map based on the morphological method.

According to the embodiments of the present disclosure, the fifth obtaining sub-module may include a first obtaining unit, a second obtaining unit, a third obtaining unit, and a fourth obtaining unit.

The first obtaining unit is used to process the cell region map by performing a dilation operation, so as to obtain a first dilated cell region map.

The second obtaining unit is used to process the first dilated cell region map by performing a filling operation, so as to obtain a dilated and filled cell region map.

The third obtaining unit is used to process the dilated and filled cell region map by performing an erosion operation, so as to obtain a filled cell region map.

The fourth obtaining unit is used to obtain the intermediate cell region map according to the filled cell region map and the cell edge map.

According to the embodiments of the present disclosure, the fourth obtaining unit may include a first obtaining sub-unit.

The first obtaining sub-unit is used to remove a target cell edge in the filled cell region map according to the filled cell region map and the cell edge map, so as to obtain the intermediate cell region map.

According to the embodiments of the present disclosure, the seventh obtaining sub-module may include a fifth obtaining unit and a sixth obtaining unit.

The fifth obtaining unit is used to obtain a cell nucleus map corresponding to a connected component cell region map in the at least one connected component cell region map according to the cell nucleus region map and the connected component cell region map based on the morphological method.

The sixth obtaining unit is used to obtain the target cell nucleus map according to the cell nucleus maps respectively corresponding to the at least one connected component cell region map.

According to the embodiments of the present disclosure, the fifth obtaining unit may include a second obtaining sub-unit and a third obtaining sub-unit.

The second obtaining sub-unit is used to, in a case of determining that the area of the connected component cell region map is greater than or equal to a first predetermined area threshold, process the connected component cell region map based on the morphological method to obtain an intermediate connected component cell region map; and obtain the cell nucleus map corresponding to the connected component cell region map according to the intermediate connected component cell region map and the cell nucleus region map.

The third obtaining sub-unit is used to, in a case of determining that the area of the connected component cell region map is less than the first predetermined area threshold, obtain the cell nucleus map corresponding to the connected component cell region map according to the cell nucleus region map and the connected component cell region map.

According to the embodiments of the present disclosure, the second obtaining sub-unit may be further used to: perform an AND operation on the intermediate connected component cell region map and the cell nucleus region map to obtain a first intersection cell region map, and obtain the cell nucleus map corresponding to the connected component cell region map according to the first intersection cell region map and the intermediate connected component cell region map.

According to the embodiments of the present disclosure, obtaining the cell nucleus map corresponding to the connected component cell region map according to the first intersection cell region map and the intermediate connected component cell region map may include the following operations.

A first template image is generated, where a size of the first template image is equal to a size of the intermediate connected component cell region map, and a pixel value of a pixel of the first template image is a first predetermined pixel value. A first candidate cell nucleus map corresponding to the connected component cell region map is obtained according to the first template image, the first intersection cell region map and the intermediate connected component cell region map. The cell nucleus map corresponding to the connected component cell region map is obtained according to the first candidate cell nucleus map corresponding to the connected component cell region map.

According to the embodiments of the present disclosure, obtaining the first candidate cell nucleus map corresponding to the connected component cell region map according to the first template image, the first intersection cell region map and the intermediate connected component cell region map may include the following operations.

A first contour set corresponding to the connected components in the first intersection cell region map is obtained. Each first predetermined pixel of the first contour set is traversed, and the pixel value of the pixel with a same label as the first predetermined pixel in the first template image is changed from the first predetermined pixel value to a second predetermined pixel value, until a traversal is completed, so as to obtain the first candidate cell nucleus map corresponding to the connected component cell region map. The label of the first predetermined pixel in the first template image is determined according to the label of the first predetermined pixel in the intermediate connected component cell region map.

According to the embodiments of the present disclosure, obtaining the first candidate cell nucleus map corresponding to the connected component cell region map according to the first template image, the first intersection cell region map and the intermediate connected component cell region map may include the following operations.

Each second predetermined pixel in the first template image is traversed, and the pixel value of the pixel with the same label as the second predetermined pixel in the first template image is changed from the first predetermined pixel value to the second predetermined pixel value when it is determined that the pixel value of the pixel corresponding to the second predetermined pixel in the first intersection cell region map is an expected pixel value, until the traversal is completed, so as to obtain the first candidate cell nucleus map corresponding to the connected component cell region map. The label of the second predetermined pixel in the first template image is determined according to the label of the second predetermined pixel in the intermediate connected component cell region map.

According to the embodiments of the present disclosure, the first candidate cell nucleus map includes at least one first candidate connected component, and the cell nucleus map includes at least one connected component.

According to the embodiments of the present disclosure, obtaining the cell nucleus map corresponding to the connected component cell region map according to the first candidate cell nucleus map corresponding to the connected component cell region map may include the following operations.

For each first candidate connected component in the first candidate cell nucleus map corresponding to the connected component cell region map, the first candidate connected component whose area is determined to be greater than or equal to a second predetermined area threshold is determined as the connected component in the cell nucleus map corresponding to the connected component cell region map.

According to the embodiments of the present disclosure, the third obtaining sub-unit may be further used to: perform an AND operation on the connected component cell region map and the cell nucleus region map to obtain a second intersection cell region map; and obtain the cell nucleus map corresponding to the connected component cell region map according to the second intersection cell region map and the connected component cell region map.

According to the embodiments of the present disclosure, obtaining the cell nucleus map corresponding to the connected component cell region map according to the second intersection cell region map and the connected component cell region map may include the following operations.

A second template image is generated, where a size of the second template image is equal to the size of the connected component cell region map, and a pixel value of a pixel of the second template image is the first predetermined pixel value. A second candidate cell nucleus map corresponding to the connected component cell region map is obtained according to the second template image, the second intersection cell region map and the connected component cell region map. The cell nucleus map corresponding to the connected component cell region map is obtained according to the second candidate cell nucleus map corresponding to the connected component cell region map.

According to the embodiments of the present disclosure, obtaining the second candidate cell nucleus map corresponding to the connected component cell region map according to the second template image, the second intersection cell region map and the connected component cell region map may include the following operations.

A second contour set corresponding to the connected components in the second intersection cell region map is determined. Each third predetermined pixel of the second contour set is traversed, and the pixel values of the pixels, which have the same label as the third predetermined pixel, in the second template image, are changed from the first predetermined pixel value to the second predetermined pixel value until the traversal is completed, so as to obtain the second candidate cell nucleus map corresponding to the connected component cell region map. The label of the third predetermined pixel in the second template image is determined according to the label of the third predetermined pixel in the connected component cell region map.

According to the embodiments of the present disclosure, obtaining the second candidate cell nucleus map corresponding to the connected component cell region map according to the second template image, the second intersection cell region map and the connected component cell region map may include the following operations.

Each fourth predetermined pixel in the second template image is traversed, and the pixel values of the pixels, which have the same label as the fourth predetermined pixel, in the second template image, are changed from the first predetermined pixel value to the second predetermined pixel value in a case that the pixel corresponding to the fourth predetermined pixel, in the first intersection cell region map, is determined to have an expected pixel, until the traversal is completed, so as to obtain the second candidate cell nucleus map corresponding to the connected component cell region map. The label of the fourth predetermined pixel in the second template image is determined according to the label of the fourth predetermined pixel in the connected component cell region map.

According to the embodiments of the present disclosure, the second candidate cell nucleus map includes at least one second candidate connected component, and the cell nucleus map includes at least one connected component.

According to the embodiments of the present disclosure, obtaining the cell nucleus map corresponding to the connected component cell region map according to the second candidate cell nucleus map corresponding to the connected component cell region map may include the following operations.

For each second candidate connected component in the second candidate cell nucleus map corresponding to the connected component cell region map, the second candidate connected component whose area is determined to be greater than or equal to a third predetermined area threshold is determined as the connected component in the cell nucleus map corresponding to the connected component cell region map.

According to the embodiments of the present disclosure, the initial image segmentation result includes a cell edge map and a cell region map.

According to the embodiments of the present disclosure, the second obtaining module 520 may include an eighth obtaining sub-module, a ninth obtaining sub-module, a tenth obtaining sub-module, an eleventh obtaining sub-module, a twelfth obtaining sub-module, and a thirteenth obtaining sub-module.

The eighth obtaining sub-module is used to obtain a primary cell region map according to the target cell nucleus map and the cell region map.

The ninth obtaining sub-module is used to process the primary cell region map by performing a dilation operation, so as to obtain a second dilated cell region map.

The tenth obtaining sub-module is used to obtain a first intermediate cell region contour map according to the second dilated cell region map and the primary cell region map.

The eleventh obtaining sub-module is used to obtain a second intermediate cell region contour map according to the first intermediate cell region contour map and the target cell image.

The twelfth obtaining sub-module is used to obtain a third intermediate cell region contour map according to the second intermediate cell region contour map and the target nucleus map.

The thirteenth obtaining sub-module is used to obtain the target cell region contour map according to the third intermediate cell region contour map and the cell edge map.

According to the embodiments of the present disclosure, the eleventh obtaining sub-module may include a seventh obtaining unit and an eighth obtaining unit.

The seventh obtaining unit is used to perform a watershed processing on the first intermediate cell region contour map based on the target cell image, so as to obtain a fourth intermediate cell region contour map.

The eighth obtaining unit is used to set a pixel value of a pixel of a background region of the fourth intermediate cell region contour map to the first predetermined pixel value, and set a pixel value of a pixel in other regions of the fourth intermediate cell region contour map other than the background region to the second predetermined pixel value, so as to obtain the second intermediate cell region contour map.

According to the embodiments of the present disclosure, the twelfth obtaining sub-module may include a generation unit and a ninth obtaining unit.

The generation unit is used to generate a third template image. A size of the third template image is equal to the size of the second intermediate cell region contour map, and a pixel value of a pixel of the third template image is the first predetermined pixel value.

The ninth obtaining unit is used to obtain the third intermediate cell region contour map according to the third template image, the second intermediate cell region contour map and the target cell nucleus map.

According to the embodiments of the present disclosure, the ninth obtaining unit may include a determination sub-unit and a fourth obtaining sub-unit.

The determination sub-unit is used to determine a third contour set corresponding to the connected components in the target cell nucleus map.

The fourth obtaining sub-unit is used to traverse each fifth predetermined pixel of the third contour set, and change pixel values of pixels, which have a same label as the fifth predetermined pixel, in the third template image, from the first predetermined pixel value to the second predetermined pixel value until the traversal is completed, so as to obtain the third intermediate cell region contour map. The label of the fifth predetermined pixel in the third template image is determined according to the label of the fifth predetermined pixel in the second intermediate cell region contour map.

According to the embodiments of the present disclosure, the ninth obtaining unit may include a fifth obtaining sub-unit.

The fifth obtaining sub-unit is used to traverse each sixth predetermined pixel in the third template image, and change pixel values of pixels, which have a same label as the sixth predetermined pixel, in the third template image, from the first predetermined pixel value to the second predetermined pixel value until a traversal is completed in a case of determining that the pixel corresponding to the sixth predetermined pixel, in the target cell nucleus map, has an expected pixel value, so as to obtain the third intermediate cell region contour map. The label of the sixth predetermined pixel in the third template image is determined according to the label of the sixth predetermined pixel in the second intermediate cell region contour map.

According to the embodiments of the present disclosure, the third obtaining module 530 may include a fourteenth obtaining sub-module and a fifteenth obtaining sub-module.

The fourteenth obtaining sub-module is used to perform a subtraction operation on the target cell region contour map and the target cell nucleus map to obtain an intermediate cell contour map.

The fifteenth obtaining sub-module is used to perform a watershed processing on the intermediate cell contour map based on the target cell image, so as to obtain the target cell contour map.

According to the embodiments of the present disclosure, the apparatus 500 of processing the cell image may further include a first determination module and a second determination module.

The first determination module is used to determine a cell statistical information according to the target image segmentation result.

The second determination module is used to determine a cell quality evaluation result according to the cell statistical information.

According to the embodiments of the present invention, the cell statistical information includes at least one of: a cell quantity, a cell area, a cell circumference, a total cell area, a long axis length of cell, or a short axis length of cell.

Any number of the modules, sub-modules, units and sub-units according to the embodiments of the present disclosure, or at least part of functions of any number of them may be implemented in one module. Any one or more of the modules, sub-modules, units and sub-units according to the embodiments of the present disclosure may be split into a plurality of modules for implementation. Any one or more of the modules, sub-modules, units and sub-units according to the embodiments of the present disclosure may be implemented at least partially as a hardware circuit, such as a field programmable gate array (FPGA), a programmable logic array (PLA), a system on chip, a system on substrate, a system on package, an application specific integrated circuit (ASIC), or may be implemented by hardware or firmware in any other rational manner of integrating or encapsulating the circuit, or may be implemented by any one of three implementation modes of software, hardware and firmware or an appropriate combination thereof. Alternatively, one or more of the modules, sub-modules, units and sub-units according to the embodiments of the present disclosure may be implemented at least partially as a computer program module that, when executed, performs the corresponding functions.

For example, any number of the first obtaining module 510, the second obtaining module 520, the third obtaining module 530 and the fourth obtaining module 540 may be combined into one module/unit/sub-unit for implementation, or any one of the modules/units/sub-units may be split into a plurality of modules/units/sub-units. Alternatively, at least part of the functions of one or more of these modules/units/sub-units may be combined with at least part of the functions of other modules/units/sub-units and implemented in one module/unit/sub-unit. According to the embodiments of the present disclosure, at least one of the first obtaining module 510, the second obtaining module 520, the third obtaining module 530 and the fourth obtaining module 540 may be implemented at least partially as a hardware circuit, such as a field programmable gate array (FPGA), a programmable logic array (PLA), a system on chip, a system on a substrate, a system on package, an application specific integrated circuit (ASIC), or may be implemented by hardware or firmware in any other rational manner of integrating or encapsulating the circuit, or may be implemented by any one of the three implementation modes of software, hardware and firmware or an appropriate combination thereof. Alternatively, at least one of the first obtaining module 510, the second obtaining module 520, the third obtaining module 530 and the fourth obtaining module 540 may be implemented at least partially as a computer program module that, when executed, performs the corresponding functions.

It should be noted that a portion of embodiments of the present disclosure for the apparatus for processing the cell image corresponds to a portion of embodiments of the present disclosure for the method for processing the cell image. For the descriptions of the portion for the apparatus for processing the cell image, reference may be made to the portion for the method for processing the cell image, and details will not be described here.

Figure 6:
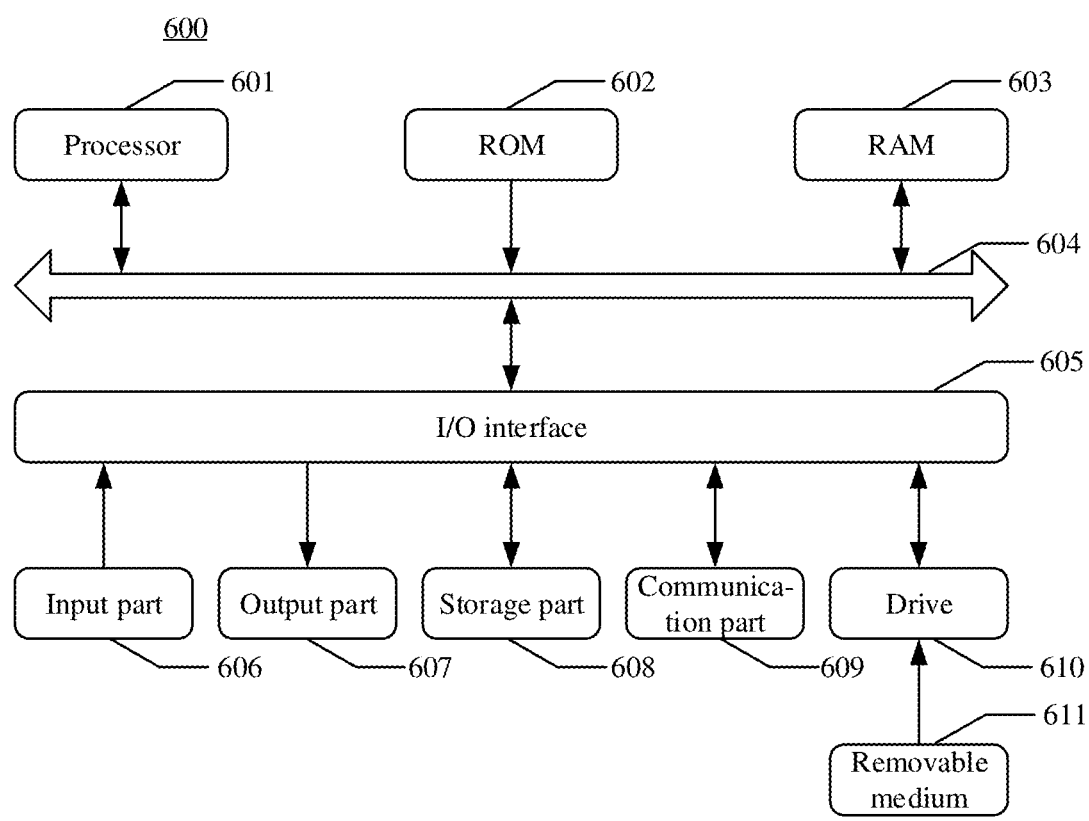
FIG. 6 schematically shows a block diagram of an electronic device applicable to implementing a method for processing a cell image according to the embodiments of the present disclosure.

FIG. 6 schematically shows a block diagram of an electronic device suitable for implementing a method for processing a cell image according to the embodiments of the present disclosure. The electronic device shown in FIG. 6 is merely an example, and should not bring any limitation to the functions and scopes of use of the embodiments of the present disclosure.

As shown in FIG. 6, an electronic device 600 according to the embodiments of the present disclosure includes a processor 601, which may execute various appropriate actions and processing according to the program stored in a read only memory (ROM) 602 or the program loaded into a random access memory (RAM) 603 from a storage part 608. The processor 601 may, for example, include a general-purpose microprocessor (for example, CPU), an instruction set processor and/or a related chipset and/or a special-purpose microprocessor (for example, an application specific integrated circuit (ASIC)), and the like. The processor 601 may further include an on-board memory for caching purposes. The processor 601 may include a single processing unit or multiple processing units for executing different actions of the method flow according to embodiments of the present disclosure.

Various programs and data required for the operation of the device 600 are stored in the RAM 603. The processor 601, the ROM 602 and the RAM 603 are connected to each other through a bus 604. The processor 601 executes various operations of the method flow according to embodiments of the present disclosure by executing the programs in the ROM 602 and/or the RAM 603. It should be noted that the program may also be stored in one or more memories other than the ROM 602 and the RAM 603. The processor 601 may also execute various operations of the method flow according to embodiments of the present disclosure by executing the programs stored in the one or more memories.

According to the embodiments of the present disclosure, the electronic device 600 may further include an input/output (I/O) interface 605 which is also connected to the bus 604. The electronic device 600 may further include one or more of the following components connected to the I/O interface 605: an input part 606 including a keyboard, a mouse, etc.; an output part 607 including a cathode ray tube (CRT), a liquid crystal display (LCD), etc. and a speaker, etc.; a storage part 608 including a hard disk, etc.; and a communication part 609 including a network interface card such as a LAN card, a modem, and the like. The communication part 609 performs communication processing via a network such as the Internet. A drive 610 is also connected to the I/O interface 605 as required. A removable medium 611, such as a magnetic disk, an optical disk, a magneto-optical disk, a semiconductor memory, and the like, is installed on the drive 610 as required, so that the computer program read therefrom is installed into the storage part 608 as needed.

The method flow according to the embodiments of the present disclosure may be implemented as a computer software program. For example, the embodiments of the present disclosure include a computer program product containing a computer program carried on a computer-readable storage medium. The computer program contains a program code for execution of the method shown in the flowchart. In such embodiments, the computer program may be downloaded and installed from the network through the communication part 609, and/or installed from the removable medium 611. When the computer program is executed by the processor 601, the above-mentioned functions defined in the system of embodiments of the present disclosure are performed. According to embodiments of the present disclosure, the above-mentioned systems, apparatuses, devices, modules, units, etc. may be implemented by computer program modules.

The present disclosure further provides a computer-readable storage medium, which may be included in the apparatus/device/system described in the above embodiments; or exist alone without being assembled into the apparatus/device/system. The above-mentioned computer-readable storage medium carries one or more programs that, when executed, perform the method according to embodiments of the present disclosure.

According to embodiments of the present disclosure, the computer-readable storage medium may be a non-transitory computer-readable storage medium, which may include but not limited to, for example, a portable computer disk, a hard disk, a random access memory (RAM), a read-only memory (ROM), an erasable programmable read-only memory (EPROM or flash memory), a portable compact disk read-only memory (CD-ROM), an optical storage device, a magnetic storage device, or any suitable combination of the above. In the present disclosure, the computer-readable storage medium may be any tangible medium that contains or stores programs that may be used by or in combination with an instruction execution system, apparatus or device.

For example, according to the embodiments of the present disclosure, the computer-readable storage medium may include the above-mentioned ROM 602 and/or RAM 603 and/or one or more memories other than the ROM 602 and RAM 603.

The embodiments of the present disclosure further include a computer program product, which contains a computer program. The computer program contains program code for performing the method provided by the embodiments of the present disclosure. When the computer program product runs on an electronic device, the program code causes the electronic device to implement the method for processing the cell image provided by the embodiments of the present disclosure.

When the computer program is executed by the processor 601, the above-mentioned functions defined in the system/apparatus for the embodiments of the present disclosure are performed. According to the embodiments of the present disclosure, the above-mentioned systems, apparatuses, modules, units, etc. may be implemented by computer program modules.

In an embodiment, the computer program may rely on a tangible storage medium such as an optical storage device and a magnetic storage device. In another embodiment, the computer program may also be transmitted and distributed in the form of signals over a network medium, downloaded and installed through the communication part 609, and/or installed from the removable medium 611. The program code included in the computer program may be transmitted by any suitable network medium, including but not limited to a wireless one, a wired one, or any suitable combination of the above.

According to the embodiments of the present disclosure, the program codes for executing the computer programs provided by the embodiments of the present disclosure may be written in any combination of one or more programming languages. In particular, these computing programs may be implemented using high-level procedures and/or object-oriented programming languages, and/or assembly/machine languages. Programming languages include, but are not limited to, Java, C++, Python, "C" language or similar programming languages. The program codes may be completely executed on a user computing device, partially executed on a user device, partially executed on a remote computing device, or completely executed on a remote computing device or a server. In a case of involving a remote computing device, the remote computing device may be connected to a user computing device through any kind of network, including a local area network (LAN) or a wide area networks (WAN), or may be connected to an external computing device (e.g., through the Internet using an Internet service provider).

The flowcharts and block diagrams in the accompanying drawings illustrate the possible architecture, functions, and operations of the systems, methods and computer program products according to various embodiments of the present disclosure. In this regard, each block in the flowcharts or block diagrams may represent a part of a module, a program segment or a code, which includes one or more executable instructions for implementing the specified logical function. It should also be noted that, in some alternative implementations, the functions noted in the blocks may also occur in a different order from that noted in the accompanying drawings. For example, two blocks shown in succession may actually be executed substantially in parallel, or they may sometimes be executed in a reverse order, depending on the functions involved. It should also be noted that each block in the block diagrams or flowcharts and the combination of blocks in the block diagrams or flowcharts may be implemented by a dedicated hardware-based system that performs the specified functions or operations, or may be implemented by a combination of dedicated hardware and computer instructions. Those skilled in the art may understand that the embodiments of the present disclosure and/or the features described in the claims may be combined in various ways, even if such combinations are not explicitly described in the present disclosure. In particular, the embodiments of the present disclosure and/or the features described in the claims may be combined in various ways without departing from the spirit and teachings of the present disclosure. All these combinations fall within the scope of the present disclosure.

The embodiments of the present disclosure have been described above. However, these embodiments are merely for illustrative purposes and are not intended to limit the scope of the present disclosure. Although the embodiments have been described separately above, this does not mean that measures in the respective embodiments may not be used in combination advantageously. The scope of the present disclosure is defined by the appended claims and their equivalents. Those skilled in the art may make various substitutions and modifications without departing from the scope of the present disclosure, and these substitutions and modifications should all fall within the scope of the present disclosure.

What is claimed is:

1. A method for processing a cell image, comprising:
   obtaining, based on a morphological method, a target cell nucleus map according to an initial image segmentation result of a target cell image, wherein the target cell image is an image corresponding to at least one cell;
   obtaining, based on the morphological method, a target cell region contour map according to the target cell nucleus map and the initial image segmentation result;
   obtaining, based on the morphological method, a target cell contour map according to the target cell region contour map and the target cell nucleus map; and
   obtaining a target image segmentation result according to the target cell contour map and the target cell nucleus map;
   wherein the initial image segmentation result comprises a cell edge map, a cell region map, and a cell nucleus region map; and
   wherein the obtaining, based on the morphological method, the target cell nucleus map according to the initial image segmentation result of the target cell image comprises:
   obtaining, based on the morphological method, an intermediate cell region map according to the cell region map and the cell edge map;
   obtaining at least one connected component cell region map according to the intermediate cell region map and a predetermined foreground region division strategy; and
   obtaining, based on the morphological method, the target cell nucleus map according to the cell nucleus region map and the at least one connected component cell region map.

2. The method according to claim 1, further comprising:
   obtaining, based on a thresholding segmentation method, the initial image segmentation result according to the target cell image.

3. The method according to claim 2, wherein the thresholding segmentation method comprises a maximum between-cluster variance method;
   wherein the obtaining, based on the thresholding segmentation method, the initial image segmentation result according to the target cell image comprises:
   obtaining, based on the maximum between-cluster variance method, a first gray scale threshold, a second gray scale threshold and a third gray scale threshold according to the target cell image, wherein the second gray scale threshold is greater than the third gray scale threshold and less than the first gray scale threshold;
   binarizing the target cell image according to the first gray scale threshold, so as to obtain the cell edge map;
   binarizing the target cell image according to the second gray scale threshold, so as to obtain a cell region map; and binarizing the target cell image according to the third gray scale threshold, so as to obtain the cell nucleus region map.

4. The method according to claim 1, wherein the obtaining, based on the morphological method, the intermediate cell region map according to the cell region map and the cell edge map comprises:

processing the cell region map by performing a dilation operation, so as to obtain a first dilated cell region map;

processing the first dilated cell region map by performing a filling operation, so as to obtain a dilated and filled cell region map;

processing the dilated and filled cell region map by performing an erosion operation, so as to obtain a filled cell region map; and removing a target cell edge in the filled cell region map according to the filled cell region map and the cell edge map, so as to obtain the intermediate cell region map.

5. The method according to claim 1, wherein the obtaining, based on the morphological method, the target cell nucleus map according to the cell nucleus region map and the at least one connected component cell region map comprises:

Obtaining, based on the morphological method, a cell nucleus map corresponding to a connected component cell region map in the at least one connected component cell region map according to the cell nucleus region map and the connected component cell region map; and obtaining the target cell nucleus map according to the cell nucleus map respectively corresponding to the at least one connected component cell region map.

6. The method according to claim 5, wherein the obtaining, based on the morphological method, the cell nucleus map corresponding to the connected component cell region map in the at least one connected component cell region map according to the cell nucleus region map and the connected component cell region map comprises:

processing, based on the morphological method, the connected component cell region map to obtain an intermediate connected component cell region map, in response to determining that an area of the connected component cell region map is greater than or equal to a first predetermined area threshold; and obtaining, according to the intermediate connected component cell region map and the cell nucleus region map, the cell nucleus map corresponding to the connected component cell region map; and obtaining, according to the cell nucleus region map and the connected component cell region map, the cell nucleus map corresponding to the connected component cell region map, in response to determining that the area of the connected component cell region map is less than the first predetermined area threshold.

7. The method according to claim 6, wherein the obtaining, according to the intermediate connected component cell region map and the cell nucleus region map, the cell nucleus map corresponding to the connected component cell region map comprises:

performing an AND operation on the intermediate connected component cell region map and the cell nucleus region map, so as to obtain a first intersection cell region map; and obtaining, according to the first intersection cell region map and the intermediate connected component cell region map, the cell nucleus map corresponding to the connected component cell region map.

8. The method according to claim 7, wherein the obtaining, according to the first intersection cell region map and the intermediate connected component cell region map, the cell nucleus map corresponding to the connected component cell region map comprises:

generating a first template image, wherein a size of the first template image is equal to a size of the intermediate connected component cell region map, and a pixel value of a pixel of the first template image is a first predetermined pixel value;

obtaining, according to the first template image, the first intersection cell region map and the intermediate connected component cell region map, a first candidate cell nucleus map corresponding to the connected component cell region map; and obtaining, according to the first candidate cell nucleus map corresponding to the connected component cell region map, the cell nucleus map corresponding to the connected component cell region map.

9. The method according to claim 8, wherein the obtaining, according to the first template image, the first intersection cell region map and the intermediate connected component cell region map, the first candidate cell nucleus map corresponding to the connected component cell region map comprises:

determining a first contour set corresponding to connected components in the first intersection cell region map; and traversing each first predetermined pixel of the first contour set, and changing a pixel value of a pixel, which has a same label as the first predetermined pixel, in the first template image, from the first predetermined pixel value to a second predetermined pixel value until a traversal is completed, so as to obtain the first candidate cell nucleus map corresponding to the connected component cell region map, wherein the label of the first predetermined pixel in the first template image is determined according to a label of a first predetermined pixel in the intermediate connected component cell region map.

10. The method according to claim 8, wherein the obtaining, according to the first template image, the first intersection cell region map and the intermediate connected component cell region map, a first candidate cell nucleus map corresponding to the connected component cell region map comprises:

traversing each second predetermined pixel in the first template image, and changing a pixel value of pixel, which has a same label as the second predetermined pixel, in the first template image, from the first predetermined pixel value to the second predetermined pixel value until a traversal is completed, in response to determining that a pixel corresponding to the second predetermined pixel in the first intersection cell region map has an expected pixel value, so as to obtain the first candidate cell nucleus map corresponding to the connected component cell region map, wherein the label of the second predetermined pixel in the first template image is determined according to a label of a second predetermined pixel in the intermediate connected component cell region map.

11. The method according to claim 6, wherein obtaining the cell nucleus map corresponding to the connected component cell region map according to the cell nucleus region map and the connected component cell region map comprises:

performing an AND operation on the connected component cell region map and the cell nucleus region map to obtain a second intersection cell region map; and obtaining, according to the second intersection cell region map and the connected component cell region map, the cell nucleus map corresponding to the connected component cell region map;

generating a second template image, wherein a size of the second template image is equal to a size of the connected component cell region map, and a pixel value of a pixel of the second template image is a first predetermined pixel value;

obtaining, according to the second template image, the second intersection cell region map and the connected component cell region map, a second candidate cell nucleus map corresponding to the connected component cell region map; and obtaining, according to the second candidate cell nucleus map corresponding to the connected component cell region map, the cell nucleus map corresponding to the connected component cell region map.

12. The method according to claim 11, wherein the obtaining, according to the second template image, the second intersection cell region map and the connected component cell region map, the second candidate cell nucleus map corresponding to the connected component cell region map comprises:

determining a second contour set corresponding to connected components in the second intersection cell region map; and traversing each third predetermined pixel of the second contour set, and changing a pixel value of pixel, which has a same label as the third predetermined pixel, in the second template image, from the first predetermined pixel value to a second predetermined pixel value until a traversal is completed, so as to obtain the second candidate cell nucleus map corresponding to the connected component cell region map, wherein the label of the third predetermined pixel in the second template image is determined according to a label of a third predetermined pixel in the connected component cell region map.

13. The method according to claim 11, wherein the obtaining, according to the second template image, the second intersection cell region map and the connected component cell region map, a second candidate cell nucleus map corresponding to the connected component cell region map comprises:

traversing each fourth predetermined pixel in the second template image, and changing a pixel value of a pixel, which has a same label as the fourth predetermined pixel, in the second template image, from the first predetermined pixel value to a second predetermined pixel value until a traversal is completed, in response to determining that the pixel corresponding to the fourth predetermined pixel in the second intersection cell region map has an expected pixel value, so as to obtain the second candidate cell nucleus map corresponding to the connected component cell region map, wherein the label of the fourth predetermined pixel in the second template image is determined according to a label of a fourth predetermined pixel in the connected component cell region map.

14. The method according to claim 1, wherein the initial image segmentation result comprises a cell edge map and a cell region map;

wherein the obtaining, based on the morphological method, the target cell region contour map according to the target cell nucleus map and the initial image segmentation result comprises:

obtaining a primary cell region map according to the target cell nucleus map and the cell region map;

processing the primary cell region map by performing a dilation operation, so as to obtain a second dilated cell region map;

obtaining a first intermediate cell region contour map according to the second dilated cell region map and the primary cell region map;

obtaining a second intermediate cell region contour map according to the first intermediate cell region contour map and the target cell image;

obtaining a third intermediate cell region contour map according to the second intermediate cell region contour map and the target cell nucleus map; and obtaining the target cell region contour map according to the third intermediate cell region contour map and the cell edge map.

15. The method according to claim 14, wherein the obtaining the second intermediate cell region contour map according to the first intermediate cell region contour map and the target cell image comprises:

performing a watershed processing on the first intermediate cell region contour map based on the target cell image, so as to obtain a fourth intermediate cell region contour map; and setting a pixel value of a pixel in a background region of the fourth intermediate cell region contour map to a first predetermined pixel value, and setting a pixel value of a pixel in other regions of the fourth intermediate cell region contour map other than the background region to a second predetermined pixel value, so as to obtain the second intermediate cell region contour map.

16. The method according to claim 15, wherein the obtaining the third intermediate cell region contour map according to the third template image, the second intermediate cell region contour map and the target cell nucleus map comprises:

determining a third contour set corresponding to connected components in the target cell nucleus map; and traversing each fifth predetermined pixel of the third contour set, and changing pixel a pixel value of a pixel, which has a same label as the fifth predetermined pixel, in the third template image, from the first predetermined pixel value to the second predetermined pixel value until the traversing is completed, so as to obtain the third intermediate cell region contour map, wherein the label of the fifth predetermined pixel in the third template image is determined according to a label of a fifth predetermined pixel in the second intermediate cell region contour map; or wherein the obtaining the third intermediate cell region contour map according to the third template image, the second intermediate cell region contour map and the target cell nucleus map comprises:

traversing each sixth predetermined pixel in the third template image, and changing pixel values of pixels, which have a same label as the sixth predetermined pixel, in the third template image, from the first predetermined pixel value to the second predetermined pixel value until the traversing is completed, in response to determining that a pixel corresponding to the sixth predetermined pixel in the target cell nucleus map has an expected pixel value, so as to obtain the third intermediate cell region contour map, wherein the label of the sixth predetermined pixel in the third template image is determined according to a label of a sixth predetermined pixel in the second intermediate cell region contour map.

17. The method according to claim 15, wherein the obtaining the third intermediate cell region contour map according to the second intermediate cell region contour map and the target cell nucleus map comprises:
generating a third template image, wherein a size of the third template image is equal to a size of the second intermediate cell region contour map, and a pixel value of a pixel of the third template image is the first predetermined pixel value; and
obtaining the third intermediate cell region contour map according to the third template image, the second intermediate cell region contour map and the target cell nucleus map.

18. The method according to claim 1, wherein the obtaining, based on the morphological method, a target cell contour map according to the target cell region contour map and the target cell nucleus map comprises:
performing a subtraction operation on the target cell region contour map and the target cell nucleus map to obtain an intermediate cell contour map; and
performing a watershed processing on the intermediate cell contour map based on the target cell image, so as to obtain the target cell contour map;
wherein the method further comprises:
determining a cell statistical information according to the target image segmentation result; and
determining a cell quality evaluation result according to the cell statistical information,
wherein the cell statistical information comprises at least one of: a cell quantity, a cell area, a cell circumference, a total cell area, a long axis length of the cell, or a short axis length of the cell.

19. An electronic device, comprising:
one or more processors; and
a memory configured to store one or more programs, wherein the one or more programs, when executed by the one or more processors, cause the one or more processors to implement the method according to claim 1.

20. A non-transitory computer-readable storage medium having executable instructions stored thereon, wherein the instructions, when executed by a processor, cause the processor to implement the method according to claim 1.

* * * * *